(12) United States Patent
Hu et al.

(10) Patent No.: US 11,019,649 B2
(45) Date of Patent: May 25, 2021

(54) CHANNEL DETECTION APPARATUS AND METHOD, USER EQUIPMENT, AND BASE STATION

(71) Applicants: Bingshan Hu, Beijing (CN); Chen Sun, Beijing (CN)

(72) Inventors: Bingshan Hu, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/066,151

(22) PCT Filed: Jan. 25, 2017

(86) PCT No.: PCT/CN2017/072562
§ 371 (c)(1),
(2) Date: Jun. 26, 2018

(87) PCT Pub. No.: WO2017/133612
PCT Pub. Date: Aug. 10, 2017

(65) Prior Publication Data
US 2018/0376494 A1 Dec. 27, 2018

(30) Foreign Application Priority Data
Feb. 2, 2016 (CN) .......................... 201610074262.1

(51) Int. Cl.
*H04W 72/12* (2009.01)
*H04W 24/02* (2009.01)
(Continued)

(52) U.S. Cl.
CPC ...... *H04W 72/1284* (2013.01); *H04B 17/382* (2015.01); *H04W 16/14* (2013.01);
(Continued)

(58) Field of Classification Search
CPC . H04W 72/1284; H04W 16/14; H04W 24/02; H04W 28/0278; H04W 72/0453;
(Continued)

(56) References Cited

U.S. PATENT DOCUMENTS

2012/0327872 A1* 12/2012 Han ...................... H04L 1/0006
370/329
2014/0192659 A1* 7/2014 Tian ................... H04W 72/0453
370/252
(Continued)

FOREIGN PATENT DOCUMENTS

CN 104333873 A 2/2015
CN 104469914 A 3/2015
(Continued)

OTHER PUBLICATIONS

International Search Report dated Mar. 29, 2017 in PCT/CN2017/072562 filed Jan. 25, 2017.
(Continued)

*Primary Examiner* — Hardikkumar D Patel
(74) *Attorney, Agent, or Firm* — Xsensus, LLP

(57) ABSTRACT

Disclosed are a channel detection apparatus and method, as well as a user equipment and a base station comprising the channel detection apparatus. The channel detection apparatus is used for performing channel detection over a plurality of carriers in an unlicensed frequency band, and comprises at least one processing circuit. The plurality of carriers comprise a first carrier and a second carrier. The processing circuit is configured to: perform channel detection of whether a channel is idle on the first carrier; and trigger, when it is detected that the channel is occupied during the channel detection on the first carrier, channel detection of whether a channel is idle on the second carrier.

5 Claims, 16 Drawing Sheets

(51) Int. Cl.
*H04B 17/382* (2015.01)
*H04W 74/08* (2009.01)
*H04W 16/14* (2009.01)
*H04W 28/02* (2009.01)
*H04W 72/04* (2009.01)
*H04W 72/14* (2009.01)
*H04B 17/345* (2015.01)

(52) U.S. Cl.
CPC ....... *H04W 24/02* (2013.01); *H04W 28/0278* (2013.01); *H04W 72/0453* (2013.01); *H04W 72/14* (2013.01); *H04W 74/0808* (2013.01); *H04B 17/345* (2015.01)

(58) Field of Classification Search
CPC . H04W 72/14; H04W 74/0808; H04W 72/12; H04W 28/02; H04W 72/04; H04W 74/08; H04W 72/1289; H04W 88/02; H04W 16/10; H04W 72/046; H04W 72/0446; H04W 4/70; H04W 72/085; H04W 52/38; H04W 72/0473; H04W 52/34; H04W 52/50; H04W 52/146; H04W 52/346; H04W 72/044; H04B 17/382; H04B 17/345; H04B 17/391; H04L 27/26; H04L 27/2626; H04L 5/00; H04L 5/0048
See application file for complete search history.

(56) References Cited

U.S. PATENT DOCUMENTS

2016/0105888 A1* 4/2016 Seok ................ H04W 72/0446
370/329

2018/0049241 A1* 2/2018 Heo ................... H04W 74/0808
2018/0255576 A1* 9/2018 Bhorkar ............ H04W 74/0808
2018/0270860 A1* 9/2018 Bhorkar ............ H04W 74/0808

FOREIGN PATENT DOCUMENTS

| CN | 104539405 A | 4/2015 |
|---|---|---|
| GB | 2 229 065 A | 9/1990 |
| WO | WO 2016/082113 A1 | 6/2016 |
| WO | 2016/115678 A1 | 7/2016 |

OTHER PUBLICATIONS

Alcatel-Lucent Shanghai Bell et al: "Multi-carrier LBT operation for LAA", 3GPP Draft; RI-157014 Multi-Carrier LBT Operation for LAA-Final, 3rd Generation Partnership Project (3GPP), vol. RAN WGI, Nov. 15, 2015-Nov. 22, 2015 Nov. 15, 2015 (Nov. 15, 2015), XP051039987.

ZTE: "PHY layer solutions for LAA design", 3GPP Draft; RI-151021, 3rd Generation Partnership Project (3GPP), vol. RAN WGI, Mar. 24, 2015-Mar. 26, 2015 Mar. 18, 2015 (Mar. 18, 2015), XP050951395.

Extended European Search Report dated Dec. 3, 2018 in European Application No. 17746932.7-1219.

Office Action dated Oct. 6, 2020, in corresponding European patent Application No. 17 746 932.7, 4 pages.

Qualcomm Incorporated, "Multicarrier LBT operation", 3GPP TSG RAN WG1 #83, R1-157039, Nov. 14-22, 2015, total 3 pages, Anaheim, USA. Retrieved from the Internet: U RL:http://www.3gpp.org/ftp/Meetings_3G PP _SYNC/Ran 1 /Docs/ [retrieved on Nov. 15, 2015].

* cited by examiner

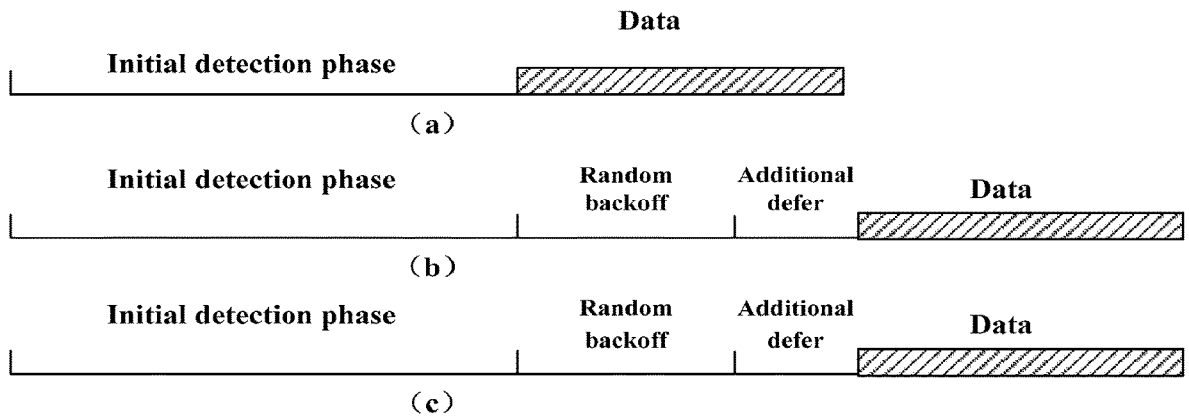

Figure 3

| Carrier number | Detection type | Parameter | Grouping information |
|---|---|---|---|
| Carrier 1 | c | Threshold and CWS/counter | Primary carrier |
| Carrier 2 | a | Threshold and CWS/counter | Secondary carrier of primary carrier 1 |
| Carrier 3 | c | Threshold and CWS/counter | Primary carrier |
| Carrier 4 | c | Threshold and CWS/counter | Secondary carrier of primary carrier 1 |
| Carrier 30 | a | Threshold and CWS/counter | Secondary carrier of primary carrier 3 |
| Carrier 31 | a | Threshold and CWS/counter | Secondary carrier of primary carrier 3 |

Figure 4

CHANNEL DETECTION APPARATUS AND METHOD, USER EQUIPMENT, AND BASE STATION

This application claims the priority to the Chinese Patent Application No. 201610074262.1, titled "CHANNEL DETECTION APPARATUS AND METHOD, USER EQUIPMENT AND BASE STATION" and filed with the Chinese State Intellectual Property Office on Feb. 2, 2016, which is incorporated herein by reference in its entirety.

FIELD OF THE INVENTION

The embodiments of the present disclosure generally relate to the field of wireless communications, and particularly to carrier scheduling and channel detection in an unlicensed frequency band in a wireless communication system, and more particularly to a device and a method for a wireless communication system, a spectrum management device, a channel detection device and a channel detection method, and user equipment including the channel detection device and a base station including the channel detection device.

BACKGROUND OF THE INVENTION

More and more services are carried in the wireless network with development and evolution of a wireless network, and therefore, extra spectrum resources are required to support a large amount of data transmission. The spectrum resources may be characterized by for example parameters such as time, frequency, bandwidth, maximum allowable emission power and so on. Limited spectrum resources have been allocated to fixed operators and services. New available spectrum is very rare or expensive. In this case, a concept of dynamic spectrum usage is proposed, that is, spectrum resources which have been allocated to some systems or services but are not used sufficiently are used dynamically. The spectrum resources are unlicensed for a system which uses the spectrum resources dynamically. A wireless communication system determines whether an unlicensed frequency band is available before using the unlicensed frequency band. Since communication systems of different operators and communication systems under different communication protocols have equal rights to use the unlicensed frequency band, a problem urgent to be solved in the industry is how to use transmission resources of the unlicensed frequency band fairly and effectively.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, there is provided a device for a wireless communication system, which includes at least one processing circuit configured to: generate, for at least one group of carriers in an unlicensed frequency band, at least one set of channel detection parameters for use by user equipment to detect whether a channel is idle, wherein the at least one group of carriers are acquired by grouping at least a part of carriers in the unlicensed frequency band; generate carrier grouping information indicating a result of the grouping of the carriers; and generate an uplink scheduling grant for the at least one group of carriers.

According to another aspect of the present disclosure, there is provided a device for a wireless communication system, which includes at least one processing circuit configured to: determine, based on carrier grouping information for an unlicensed frequency band and an uplink scheduling grant for the unlicensed frequency band received from a base station, a group of carriers on which channel detection is to be performed; and perform channel detection on a carrier in the determined group of carriers using channel detection parameters received from the base station.

According to another aspect of the present disclosure, there is provided a spectrum management device, which includes: at least one processing circuit, configured to group carriers in an unlicensed frequency band; and a transmitting unit, configured to provide carrier grouping information on the grouping of the carriers to a base station.

According to another aspect of the present disclosure, there is provided a method for a wireless communication system, including: for at least one group of carriers in an unlicensed frequency band, generating at last one set of channel detection parameters for use by user equipment to detect whether a channel is idle, wherein the at least one group of carriers are acquired by grouping at least a part of carriers in the unlicensed frequency band; generating carrier grouping information indicating a result of the grouping of the carriers; and generating an uplink scheduling grant for the at least one group of carriers.

According to another aspect of the present disclosure, there is provided a method for a wireless communication system, including: determining, based on carrier grouping information for an unlicensed frequency band and an uplink scheduling grant for the unlicensed frequency band received from a base station, a group of carriers on which channel detection is to be performed; and performing channel detection on a carrier in the determined group of carriers using channel detection parameters received from the base station.

According to yet another aspect of the present disclosure, there is provided a channel detection device for performing channel detection on multiple carriers in an unlicensed frequency band, which includes at least one processing circuit. The multiple carriers include a first carrier and a second carrier. The processing circuit is configured to perform channel detection of whether a channel being idle on the first carrier, and trigger channel detection of whether a channel being idle on the second carrier in a case that it is detected during the channel detection on the first carrier that the channel is occupied.

According to another aspect of the present disclosure, there is provided a channel detection method for performing channel detection on multiple carriers in an unlicensed frequency band. The multiple carriers include a first carrier and a second carrier. The channel detection method includes: performing channel detection of whether a channel being idle on the first carrier, and triggering channel detection of whether a channel being idle on the second carrier in a case that it is detected during the channel detection on the first carrier that the channel is occupied.

According to another aspect of the present disclosure, there is further provided user equipment including the channel detection device described above and a base station including the channel detection device described above.

According to another aspect of the present disclosure, there is further provided user equipment including the channel detection device for performing channel detection on multiple carriers in an unlicensed frequency band. The channel detection device includes at least one processing circuit. The multiple carriers are grouped into multiple groups of carriers, and each group of carriers includes at least one first carrier and at least one second carrier. The processing circuit is configured to: perform channel detection of whether a channel being idle on the first carrier in each group of carriers, and trigger channel detection of whether a channel being idle on the second carrier in the group of carriers in a case that it is detected during the channel detection on the first carrier in the group of carriers that the channel is occupied.

According to other aspects of the present disclosure, there are also provided computer program codes and computer program products for implementing the method for the wireless communication system and the channel detection method described above, and a computer readable storage medium, on which the computer program codes for implementing the method for the wireless communication system and the channel detection method described above are recorded.

In the embodiments of the present disclosure, the carriers in the unlicensed frequency band are grouped and an uplink scheduling grant corresponding to each group of carriers is generated, thereby improving usage efficiency of resources in the unlicensed frequency band. In addition, cascaded channel detection is performed on multiple carriers, thereby reducing calculation complexity.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings:

FIG. 3 is a schematic diagram showing an example of a type of the energy detection;

FIG. 4 shows an example of a signaling configuration of carrier grouping information and energy detection parameters;

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and timeconsuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

Figure 1:
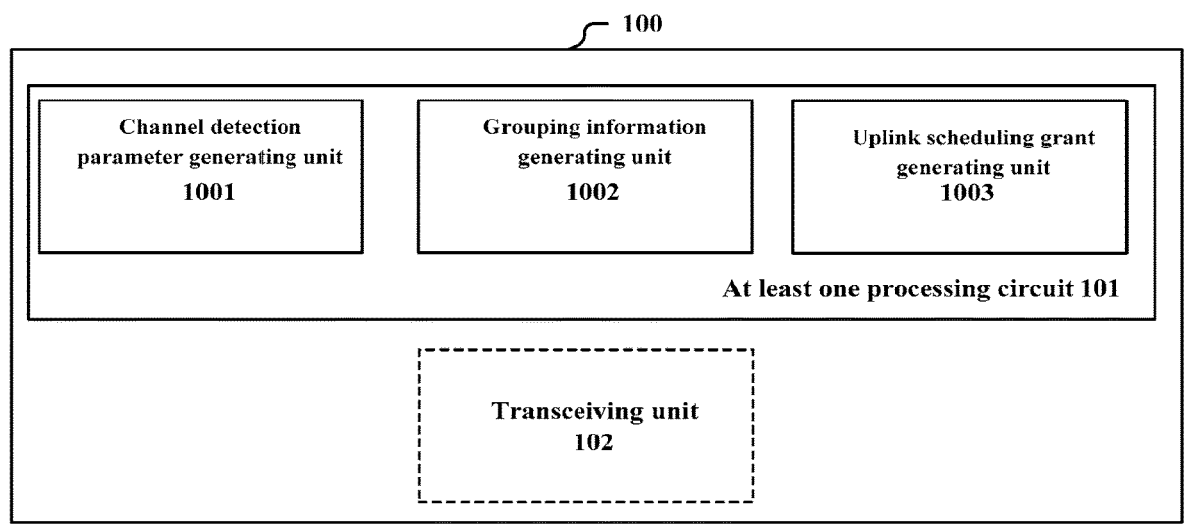
FIG. 1 is a structural block diagram of a device for a wireless communication system according to an embodiment of the present disclosure.

FIG. 1 is a structural block diagram of a device 100 for a wireless communication system according to an embodiment of the present disclosure, and the device 100 includes at least one processing circuit 101 configured to: generate, for at least one group of carriers in an unlicensed frequency band, at least one set of channel detection parameters for use by user equipment to detect whether a channel is idle, wherein the at least one group of carriers are acquired by grouping at least a part of carriers in the unlicensed frequency band; generate carrier grouping information indicating a result of the grouping of the carriers; and generate an uplink scheduling grant for the at least one group of carriers. The device 100 may be located for example at a network management side such as a base station of the wireless communication system.

In the present disclosure, there is considered a correspondence relationship between channels and carriers, that is, one carrier corresponds to one channel. Detection on a carrier is referred to as channel detection. In a case that a carrier is not occupied, the carrier is considered as idle and a channel corresponding to the carrier is idle. The carrier and the channel are not distinguished in particular in the description hereinafter.

In addition, FIG. 1 further shows an example of functional modules of a processing circuit 101. As shown in FIG. 1, the processing circuit 101 includes a channel detection parameter generating unit 1001, a grouping information generating unit 1002 and an uplink scheduling grant generating unit 1003. It should be understood that the functional modules may be implemented by processing circuits respectively, or may all be implemented by one processing circuit, or may be implemented as a part of a processing circuit. Alternatively, each of the functional modules may be implemented by multiple processing circuits. In other words, implementation of the functional modules is not limited. The processing circuit 101 may be for example a central processing unit (CPU), a microprocessor, an integrated circuit module and the like with data processing capability. A structure and a function of the device 100 are described in detail below with reference to FIG. 1.

In an LTE communication system, user equipment should acquire an uplink scheduling grant from a base station before communicating in an unlicensed frequency band, and performs channel detection upon receiving the uplink scheduling grant to determine whether a scheduled channel is idle. The user equipment may perform data transmission using the scheduled uplink transmission resources only in a case that the channel is idle. However, it is possible during the channel detection that the scheduled carrier is occupied while there may be another idle carrier which is not scheduled. It is desirable to raise a probability that the scheduled carrier can be used for uplink transmission, so as to improve usage efficiency of resources in the unlicensed frequency band.

It should be understood that although the technology is described with respect to the LTE communication system, the technology is also applicable to the future 5G or even a more advanced wireless communication system.

In the present disclosure, the base station may transmit multiple uplink scheduling grants to the user equipment, so that the user equipment can perform uplink data transmission using multiple carriers (that is, carrier aggregation in the unlicensed frequency band). In this way, communication quality and capacity of data transmission of the user equipment in the unlicensed frequency band are improved.

In another aspect, in the embodiment, at least a part of carriers in the unlicensed frequency band are grouped, to obtain at least one group of carriers. Uplink scheduling is performed on a group of carriers rather than a single carrier, thereby raising a probability that the scheduled carrier can be used for uplink transmission. The number of groups of carriers is determined based on for example transmission capability of the user equipment itself or the number of carriers to be simultaneously used for uplink transmission. Specifically, in a case that the user equipment is to perform uplink transmission with N carriers simultaneously, N groups of carriers may be obtained. Each group of carriers includes for example three carriers, and the number of carriers in each group of carriers may be set based on for example the number of continuous available carriers in the unlicensed frequency band or the like.

Figure 2:
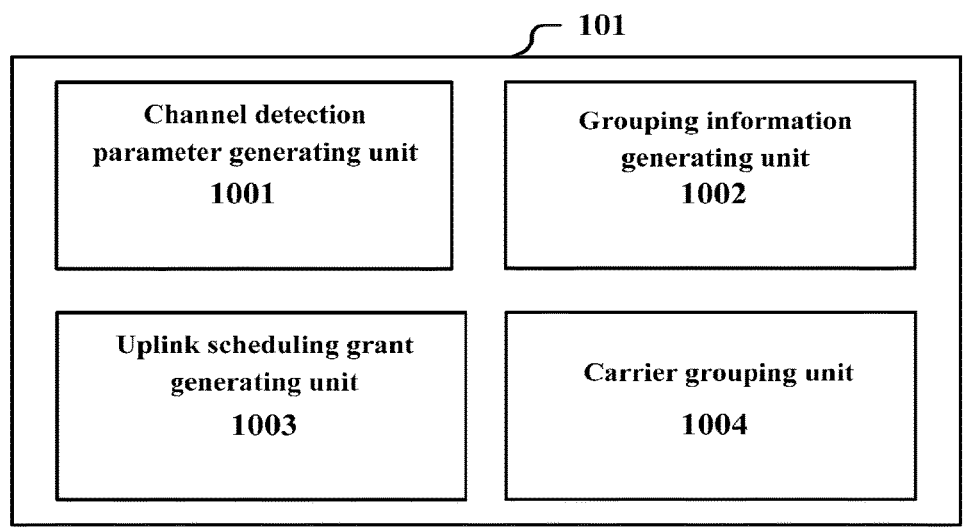
FIG. 2 is a block diagram of another structure example of a processing circuit shown in FIG. 1.

For example, the processing circuit 101 may be further configured to group carriers in the unlicensed frequency band. Correspondingly, as shown in FIG. 2, the processing circuit may further include a carrier grouping unit 1004 configured to group the carriers in the unlicensed frequency band. For example, the processing circuit 101 is configured to group the carriers in the unlicensed frequency band into multiple groups of carriers.

The carrier grouping unit 1004 may group all carriers in the unlicensed frequency band, or just group a part of the carriers in the unlicensed frequency band. For example, in a case that there are 32 carriers in total and four groups of carriers are required, the 32 carriers may be grouped into four groups of carriers, and each group of carriers includes eight carriers. Alternatively, in consideration of complexity of channel detection, only 12 carriers among the 32 carriers may be selected, and are grouped into four groups of carriers.

As an example, the carrier grouping unit 1004 may group the carriers based on at least one of a frequency band location of each carrier, a usage status of each carrier, an amount of data to be transmitted for each service of the user equipment, and information in a geographical location database. The amount of data to be transmitted for each service of the user equipment may be acquired for example based on a buffer status report (BSR). From another perspective, the carrier grouping unit 1004 may group the carriers based on information in the BSR uploaded by the user equipment.

For example, in a case that frequency band locations of two carriers are close or adjacent to each other, channel characteristics of the two carriers may be similar, and therefore, the two carriers may be grouped into the same group. In addition, the usage status of a carrier indicates a load status on the carrier, for example, a carrier with light load may be selected to be grouped. In another aspect, for example, when the amount of data to be transmitted by the user equipment is large, a carrier with light load may be selected to be grouped. In addition, the carrier grouping unit 1004 may also take a geographical location of the user equipment into consideration by referring to information in the geographical location database. For example, in a case that a user equipment which uses a carrier to perform data transmission is far away from a user equipment for which uplink transmission resources are scheduled currently, the carrier may be selected. It should be illustrated that frequency locations of carriers in each group of carriers may be continuous, or may be discrete.

Exemplarily, the usage status of each carrier may be obtained with at least one of the following manners: being measured by a base station, being provided by a related spectrum management device, and being provided by a geographical location database.

In an example, the carrier grouping unit 1004 may group the carriers by selecting a primary carrier and then selecting a secondary carrier allocated to the primary carrier, wherein a priority level for the user equipment to use the primary carrier to perform data transmission is higher than a priority level for the user equipment to use the secondary carrier to perform data transmission. In practice, the carrier grouping unit 1004 may group the carriers in another manner, which is not limited. For example, carriers to be grouped into the same group are selected first, and then a primary carrier and a secondary carrier are specified.

Correspondingly, the grouping information generating unit 1002 generates carrier grouping information indicating a result of the grouping the carriers, such as information indicating carriers in each group of carriers. In an example, the carrier grouping information may include information indicating a group to which a carrier belongs, and information indicating whether the carrier is a primary carrier or a secondary carrier in the group. For example, assuming that a group of carriers includes a carrier 1, a carrier 2 and a carrier 3, and the carrier 1 is a primary carrier and the carrier 2 and the carrier 3 are secondary carriers, the carrier grouping information may include: a carrier 1→a primary carrier; a carrier 2→a secondary carrier of the carrier 1; and a carrier 3→a secondary carrier of the carrier 1.

In addition, the device 100 may not include the carrier grouping unit 1004, that is, the processing circuit 101 does not execute the above mentioned function of grouping the carriers. Instead, a related spectrum management device groups the carriers and provides a result of the grouping the carriers to the device 100.

The channel detection parameter generating unit 1001 generates at least one set of channel detection parameters to be used by the user equipment to detect whether a channel is idle, for each group of carriers obtained by grouping. Multiple sets of channel detection parameters are generated, to provide flexibility of proper selection to the user equipment. Especially in a case that the same channel detection parameter is generated for all user equipment in a cell (cell-specific), the presence of multiple sets of channel detection parameters provides better adaptability to different user equipment, thereby achieving a balance between accuracy of channel detection and signaling overhead.

In another aspect, the channel detection parameter generating unit 1001 may generate at least one set of channel detection parameters for each of the user equipment, respectively (UE-specific). In this case, the generated channel detection parameters may be based on a particular status of the user equipment, thereby improving accuracy of channel detection.

The same channel detection parameter may be set for all carriers in each group of carriers, however, which is not limited thereto. For each group of carriers, the channel detection parameter for the primary carrier may be different from the channel detection parameter for the secondary carrier. For example, channel detection on the primary carrier is more complex than channel detection on the secondary carrier, and the channel detection parameter for the primary carrier is set stricter than the channel detection parameter for the secondary carrier, thereby saving power consumption of channel detection. In practice, different channel detection parameters may be set for all carriers in each group of carrier, thereby further improving accuracy of the channel detection.

The manner for channel detection, i.e., detection of whether a channel being idle, includes energy detection or characteristic detection. The energy detection refers to detecting whether a signal is transmitted on a channel, and the characteristic detection refers to detecting which type of communication device is occupying the channel. The characteristic detection includes preamble detection and PLMN+ PSS/SSS detection. The preamble detection may be used to detect whether a WiFi signal is being transmitted, and the PLMN+PSS/SSS detection is used to detect whether there is an LTE signal and which type of LTE signal is being transmitted, which is applicable to the 4G Similarly, the channel detection described here is also applicable to the future 5G or a more advanced wireless communication system. In the following description, the energy detection is taken as an example, however, it should be understood that the technology is also applicable to the characteristic detection.

The channel detection may be implemented in a manner of listen before talk (LBT). The LBT refers to checking whether a channel is idle by clear channel assessment (CCA) before using the channel or the carrier. For example, the CCA may determine whether the channel is occupied based on a result of energy detection on the channel. In a case that the channel detection is the energy detection, each set of channel detection parameters includes at least one of a type of the energy detection and a threshold value of the energy detection. The threshold value of the energy detection is used to determine whether a channel is occupied during the energy detection. For example, it is considered that the channel is occupied in a case that a result of energy detection indicates that a value of accumulated energy is higher than the threshold value. The type of the energy detection is used to indicate a specific manner of the energy detection. For example, the type of the energy detection includes: energy detection not involving random back-off, energy detection involving random back-off and having a fixed contention window size (CWS) and energy detection involving random back-off and having a variable contention window size.

FIG. 3 is a schematic diagram showing a type of the energy detection, and (a), (b) and (c) in FIG. 3 show the three types described above respectively. In the type (a), data transmission is performed directly after the energy detection indicates that the channel is idle. In the types (b) and (c), random back-off and additional defer are performed after an initial detection phase ends. Energy detection is also performed during a duration of the random back-off, and back-off is performed in the duration by providing a random back-off counter (also abbreviated as a counter). Counting of the random back-off counter is interrupted in a case that the energy detection indicates that the channel is occupied. The random back-off counter is set based on the contention window size. In the type (b), the contention window size is fixed. In the type (c), the contention window size is variable. A detection period is set for the energy detection. For example, in type (b) and (c), the detection period includes an initial detection phase, a random back-off phase and an additional defer phase.

The energy detection operation performed by the user equipment may be configured by setting energy detection parameters for each group of carriers. For example, in the energy detection, for a primary carrier, a type of the energy detection may be set to be the energy detection involving random back-off and having a variable contention window size, and a threshold value for determining whether a channel is idle is set to be low; and for a secondary carrier, a type of the energy detection may be set to be the energy detection not involving random back-off, and a threshold value for determining whether a channel is idle is set to be high.

FIG. 4 shows an example of a signaling configuration of the carrier grouping information and the energy detection parameters, in which, carriers 1, 2 and 4 are a group of carriers, and carriers 3, 30 and 31 are another group of carriers. Carriers 1 and 3 are primary carriers, and remaining carriers are secondary carriers. The type (c) of energy detection is used for the primary carriers, the type (c) of energy detection is also used for the secondary carrier 4, and the type (a) of energy detection is used for other secondary carriers than the secondary carrier 4.

The uplink scheduling grant generating unit 1003 generates an uplink scheduling grant for each group of carriers. As an example, the uplink scheduling grant corresponds to one carrier, that is, the uplink scheduling grant schedules the PUSCH on one carrier. However, the uplink scheduling grant is valid for all carriers in the group of carriers. In other words, upon receiving an uplink scheduling grant for scheduling one carrier, the user equipment extends, based on the carrier grouping information, the uplink scheduling grant to other carriers in a group of carriers to which the one carrier belongs, that is, it is considered that the base station schedules all the carriers in the group of carriers for the user equipment. Alternatively, as another example, the uplink scheduling grant may be changed to schedule multiple carriers in the group of carriers. For example, a new field is added in the existing uplink scheduling grant.

In this way, as long as a channel corresponding to one carrier in the group of carriers is idle, the user equipment may perform data transmission with the carrier, thereby improving usage efficiency of resources in the unlicensed frequency band.

As shown in a dashed line block in FIG. 1, the device 100 may further include: a transceiving unit 102, configured to transmit the carrier grouping information and the channel detection parameters, and subsequently transmit the uplink scheduling grant to the user equipment. The carrier grouping information and the channel detection parameters are transmitted in a licensed frequency band. In the embodiment, the transceiving unit 102 transmits the uplink scheduling grant in the licensed frequency band. In a case that there are multiple groups of carriers, the transceiving unit 102 transmits multiple uplink scheduling grants correspondingly, that is, the transceiving unit 102 notifies the user equipment that the user equipment can perform uplink data transmission with multiple carriers.

The device 100 according to the embodiment uplink schedules the group of carriers rather than a single carrier, thereby improving usage efficiency of resources in the unlicensed frequency band. In addition, the device 100 schedules uplink transmission resources on multiple carriers for the user equipment simultaneously, so that the user equipment can transmit uplink data on multiple carriers in the unlicensed frequency band, that is, implement carrier aggregation in the unlicensed frequency band.

Second Embodiment

Figure 5:
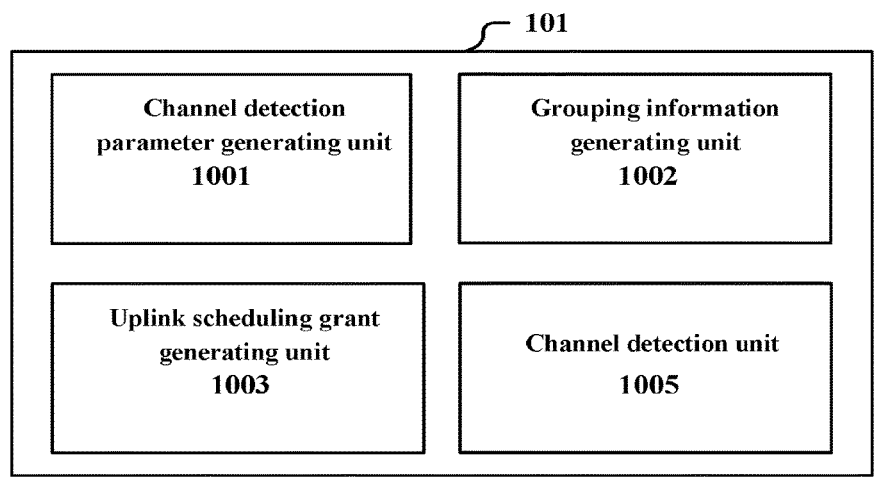
FIG. 5 is a block diagram of another structure example of a processing circuit shown in FIG. 1.

In the embodiment, the transceiving unit 102 transmits the uplink scheduling grant in the unlicensed frequency band. In view of this, the processing circuit 101 is further configured to detect whether a channel in the unlicensed frequency band is idle. This is because the transceiving unit 102 can transmit the uplink scheduling grant only in a case that the channel is idle. As shown in FIG. 5, besides the channel detection parameter generating unit 1001, the grouping information generating unit 1002 and the uplink scheduling grant generating unit 1003 described in the first embodiment, the processing circuit 101 further includes a channel detecting unit 1005 configured to detect whether a channel in the unlicensed frequency band is idle. It should be noted that although not shown in FIG. 5, the processing circuit 101 may further include the carrier grouping unit 1004 described in the first embodiment.

The channel detection parameter generating unit 1001 is further configured to generate the channel detection parameters used by the channel detecting unit 1005 to perform channel detection for a group of carriers.

Similar to the first embodiment, the channel detection includes energy detection or characteristic detection. The energy detection refers to detecting whether a signal is transmitted on a channel, and the characteristic detection refers to detecting which type of communication device is occupying the channel. The characteristic detection includes preamble detection and PLMN+PSS/SSS detection. The preamble detection may be used to detect whether a WiFi signal is being transmitted, and the PLMN+PSS/SSS detection is used to detect whether there is an LTE signal and which type of LTE signal is being transmitted, which is applicable to the 4G Likewise, the channel detection described here is also applicable to the future 5G or a more advanced wireless communication system.

In a case that the channel detection is the energy detection, the channel detection parameter includes at least one of a type of the energy detection and a threshold value of the energy detection. The threshold value of the energy detection is used to determine whether a channel is being occupied during the energy detection. For example, the type of the energy detection includes energy detection not involving random back-off, energy detection involving random back-off and having a fixed contention window size, and energy detection involving random back-off and having a variable contention window size. Reference is made to the first embodiment for specific description of the type of energy detection, which is not repeated here anymore.

Generally, channel detection performed by the device 100 is more complex than channel detection performed by the user equipment, and the channel detection parameter is set stricter than the channel detection parameter generated for the user equipment, thereby improving accuracy of channel detection at the base station side. For example, in the energy detection, the energy detection involving random back-off and having the variable contention window size may be used, and a threshold value for determining whether a channel is idle is set to be low.

In an example, the channel detecting unit 1005 performs channel detection on all carriers in each group of carriers respectively, and in a case that the channel detection indicates that a channel is idle, the transceiving unit 102 transmits the uplink scheduling grant on a carrier corresponding to the channel. In a case that there are multiple groups of carriers, the transceiving unit 102 transmits the uplink scheduling grant on multiple carriers corresponding to idle channels respectively.

In another example, before the carriers in the unlicensed frequency are grouped, the channel detecting unit 1005 may perform channel detection on multiple carriers (such as all carriers) in the unlicensed frequency band, and select carriers which are indicated to be idle during the channel detection, to be used by the transceiving unit 102 to transmit the uplink scheduling grant. In this example, the carrier grouping unit 1004 groups the carriers based on the idle carriers on which the uplink scheduling grant is transmitted, for example, the idle carrier serves as a primary carrier in a group of carriers.

The channel detecting unit 1005 may perform channel detection on all carriers when performing the channel detection described above. In other words, channel detection is performed on all carriers in parallel in a total preset channel detection time period. The preset channel detection time periods for the multiple carriers have the same end time. In the embodiment, the end time is for example a time when a downlink timeslot comes.

Figure 6:
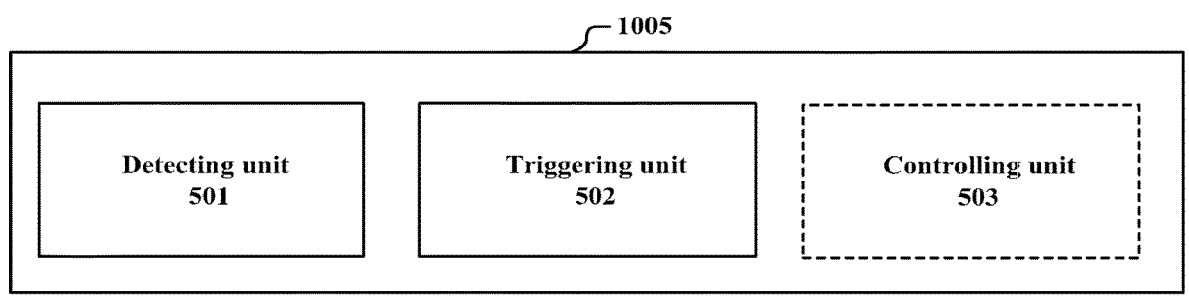
FIG. 6 is a structural block diagram of a channel detecting unit according to an embodiment of the present disclosure.

In an example, in order to reduce calculation complexity and lighten the processing load, the channel detecting unit 1005 may have a structure shown in FIG. 6. In FIG. 6, the channel detecting unit 1005 includes: a detecting unit 501, configured to perform channel detection of whether a channel being idle on a carrier; and a triggering unit 502, configured to, in a case that it is detected during the channel detection on a first carrier in each group of carriers that the channel is occupied, trigger the detecting unit 501 to perform channel detection on a second carrier other than the first carrier in the group of carriers. The "first" and "second" here are only used to distinguish different carriers, and do not represent a specific order. For example, the first carrier and the second carrier may be selected randomly. The duration of the channel detection on the first carrier refers to a time period after the channel detection on the first carrier is started. The time period may be less than or equal to the preset channel detection time period.

In other words, the channel detecting unit 1005 does not perform channel detection on the first carrier and the second carrier simultaneously, and perform cascaded channel detection on the first carrier and the second carrier. For example, in a case that although the channel detection on the first carrier is not completed, it may be judged that the channel is being occupied, channel detection on the second carrier is started. Exemplarily, channel detection on the first carrier can be continued in this case. For example, multiple detecting units 501 may be provided to perform channel detection on the first carrier and on the second carrier respectively. In this case, a duration of the channel detection on the second carrier is shorter than a duration of the channel detection on the first carrier, but the two durations have the same end time (in the embodiment, the end time is for example a time when a downlink timeslot comes).

Figure 7:
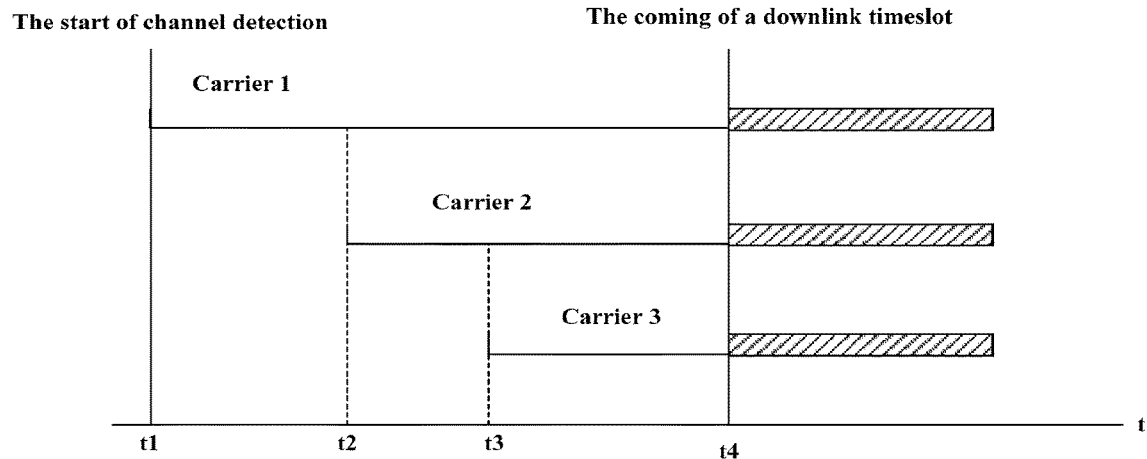
FIG. 7 shows an example of an operation of a channel detecting unit.

In addition, as shown in dashed line block in FIG. 6, the channel detecting unit 1005 may further include a control unit 503, configured to control the triggering unit 502 to trigger to perform channel detection on all carriers in each group of carriers sequentially, so that channel detection is performed on a next carrier only in a case that channel detection on a previous carrier indicates that the previous carrier is occupied, until all the carriers in the group of carriers or a downlink timeslot comes. Channel detection on all carriers in each group of carriers has different start time, but has the same end time. FIG. 7 shows an example of an operation of the channel detecting unit 1005. Assuming a group of carriers includes three carriers 1 to 3, and a horizontal axis represents a time axis. Channel detection on carrier 1 is started at a time t1, and channel detection on carrier 2 is started or triggered at a time t2 in a case of determining at the time t2 that the channel detection on carrier 1 indicates that the channel is occupied. Similarly, channel detection on carrier 3 is started or triggered at a time t3 in a case of determining that the channel is occupied during the channel detection on carrier 2 such as at the time t3. Channel detection on carriers 1 to 3 is continued until a downlink timeslot comes. In a case that a result of channel detection indicates there are multiple idle carriers at the end time, one of the multiple idle carriers is selected for data transmission. The one carrier may be selected randomly or according to a predetermined rule, for example, according to channel quality, a load status or the like. On the contrary, channel detection would not be performed on carrier 2 and carrier 3, in a case that during the channel detection on carrier 1 the channel is not detected to be occupied. Therefore, preferably, for each group of carriers, at most one carrier corresponding to an idle channel can be used for data transmission in consideration of signaling overhead.

It can be seen that calculation overhead caused by channel detection can be reduced by the cascaded channel detection manner described above.

In a case that the channel detecting unit 1005 finds an idle carrier by performing channel detection on each group of carriers, the transceiving unit 102 transmits the uplink scheduling grant for the group of carriers to the user equipment with the idle carrier. As described above, the uplink scheduling grant may be with respect to one carrier in the group of carriers but valid for all carriers in the group of carriers, alternatively, the uplink scheduling grant may be uplink scheduling grant including scheduling for multiple carriers in the group of carriers.

The device 100 according to the embodiment performs uplink scheduling on the group of carriers rather than a single carrier, thereby improving usage efficiency of resources in the unlicensed frequency band. In addition, the device 100 schedules uplink transmission resources on multiple carriers simultaneously for the user equipment, so that the user equipment can transmit uplink data on multiple carriers in the unlicensed frequency band, that is, implement carrier aggregation in the unlicensed frequency band.

Third Embodiment

Figure 8:
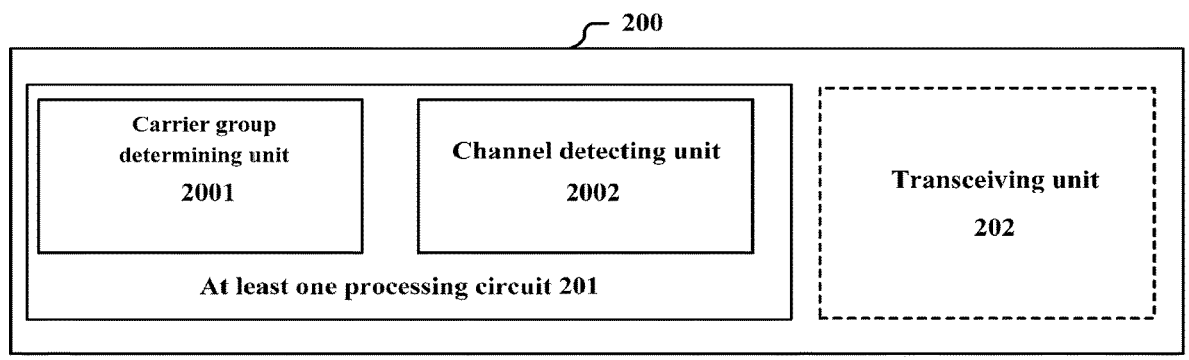
FIG. 8 is a structural block diagram of a device for wireless communication according to an embodiment of the present disclosure.

FIG. 8 is a block diagram of a device 200 for wireless communications according to an embodiment of the present disclosure, the device 200 includes at least one processing circuit 201 configured to: determine, based on carrier grouping information for an unlicensed frequency band and an uplink scheduling grant for the unlicensed frequency band received from a base station, a group of carriers on which channel detection is to be performed; and perform channel detection on a carrier in the determined group of carriers using channel detection parameters received from the base station.

The device 200 may be located for example at a user equipment side in a wireless communication system. For example, the device 200 may be implemented as a mobile terminal (such as a smart phone, a tablet personal computer (PC), a laptop PC, a portable game terminal, a portable/dongle mobile router and a digital camera device) or an on-board terminal (such as a car navigation terminal). The device 200 may also be implemented as a terminal (also referred to as a machine type communication (MTC) terminal) for performing machine-to-machine (M2M) communication. In addition, the device 200 may be a wireless communication module (such as an integrated circuit module including a single wafer) installed on each terminal described above.

In addition, FIG. 8 further shows an example of functional modules of the processing circuit 201. As shown in FIG. 8, the processing circuit 201 includes a carrier group determining unit 2001 and a channel detecting unit 2002. It should be understood that the functional modules may be implemented by processing circuits respectively, or may all be implemented by one processing circuit, or may be implemented as a part of a processing circuit. Alternatively, each functional module may be implemented by multiple processing circuits. In other words, implementation of the functional modules is not limited. The processing circuit 201 may be for example a central processing unit (CPU), a microprocessor, an integrated circuit module or the like having data processing capability. A structure and a function of the device 200 are described in detail below with reference to FIG. 8.

In a case that the user equipment in which the device 200 is located is to perform data transmission using the unlicensed frequency band, the user equipment first transmits a request to the base station and receives an uplink scheduling grant from the base station, and then uses uplink transmission resources on the unlicensed frequency band based on the uplink scheduling grant. Since other user equipment may be using the carrier scheduled by the uplink scheduling grant, the user equipment needs to perform channel detection before transmitting data, and can transmit data with the carrier scheduled by the uplink scheduling grant only in a case that the channel detection indicates that the channel is idle. Correspondingly, the user equipment further needs to acquire channel detection parameters configured by the base station for the user equipment.

In addition, in the embodiment, the user equipment also acquires carrier grouping information from the base station. As described above, in order to improve usage efficiency of resources, the base station groups the carriers into multiple groups and generates an uplink scheduling grant for each group of carriers. Therefore, the uplink scheduling grant received by the user equipment is valid for the group of carriers, even in a case that the uplink scheduling grant may only include an indication for one carrier.

For example, the carrier group determining unit 2001 determines carrier 1 as the scheduled carrier from the uplink scheduling grant, and determines that carrier 2 and carrier 3 are in the same group of carriers as carrier 1 based on the carrier grouping information. The channel detecting unit 2002 performs channel detection on carriers 1 to 3 using the channel detection parameters for the group of carriers received from the base station. In a case that any one of the carriers 1 to 3 is idle, the user equipment can perform data transmission with the idle carrier.

Figure 9:
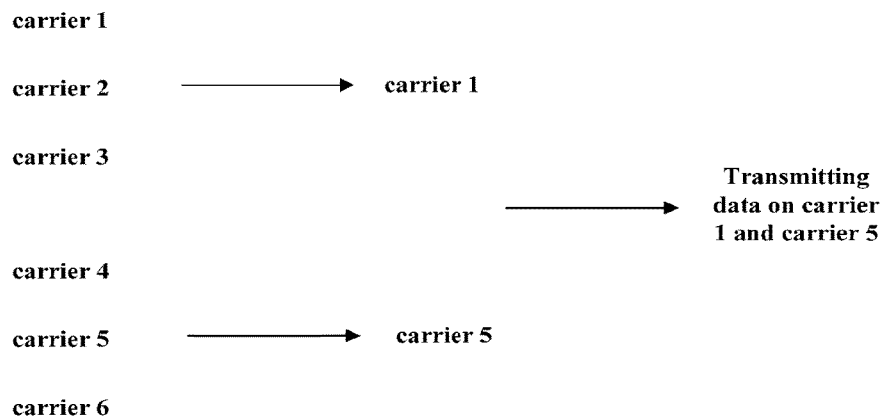
FIG. 9 is a schematic diagram showing a transmission example in a case that uplink scheduling grants for two groups of carriers are received.

In an example, the user equipment may receive multiple uplink scheduling grants from the base station. Each of the uplink scheduling grants is valid for one group of carriers. As shown in FIG. 9, two uplink scheduling grants are received by the user equipment, and the carrier grouping determining unit 2001 determines carriers 1 to 3 and carriers 4 to 6 as two scheduled groups of carriers based on the carrier grouping information, and the channel detecting unit 2002 performs channel detection on the carriers 1 to 3 and the carriers 4 to 6 respectively, and detects that carrier 1 is idle among the carriers 1 to 3 and carrier 5 is idle among the carrier 4 to 6. Therefore, the user equipment performs uplink data transmission with carrier 1 and carrier 5. It should be understood that, FIG. 9 only shows an example, and the number of uplink scheduling grants received by the user equipment is not limited to 2, and may be another number.

Figure 10:
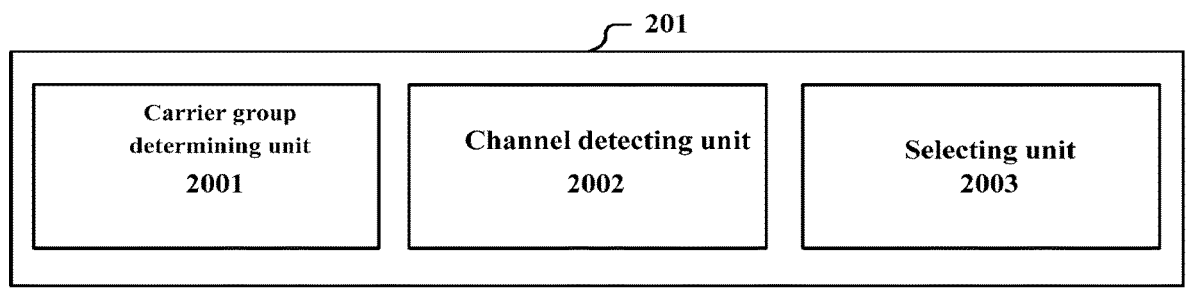
FIG. 10 is a block diagram of another structure example of the processing circuit shown in FIG. 8.

Channel detection parameters for carriers in a group of carriers may be the same with each other or may be different from each other. For example, a channel detection parameter for a primary carrier is different from a channel detection parameter for a secondary carrier. In one group of carriers, a priority level for the user equipment to use the primary carrier to perform data transmission is higher than a priority level for the user equipment to use the secondary carrier to perform data transmission. In addition, multiple sets of channel detection parameters may be generated for one group of carriers, and the processing circuit 201 may be correspondingly configured to select one set of channel detection parameters from the at least one set of channel detection parameters based on a priority level of a service of the user equipment, to perform channel detection. Accordingly, as shown in FIG. 10, the processing circuit 201 may further include a selecting unit 2003 configured to suitably select channel detection parameters.

The channel detection (that is, detection of whether a channel being idle) includes energy detection or characteristic detection. The energy detection refers to detecting whether a signal is being transmitted on a channel, and the characteristic detection refers to detecting which type of communication device is occupying the channel. The characteristic detection includes preamble detection and PLMN+PSS/SSS detection. The preamble detection may be used to detect whether a WiFi signal is being transmitted, and the PLMN+PSS/SSS detection is used to detect whether there is an LTE signal and which type of LTE signal is being transmitted, which is applicable to the 4G Likewise, the channel detection described here is also applicable to the future 5G or a more advanced wireless communication system. In the following description, the energy detection is taken as an example, however, it should be understood that the technology is also applicable to the characteristic detection.

In a case that the channel detection is the energy detection, the energy detection parameters may include at least one of a type of energy detection and a threshold value of the energy detection. The threshold value of energy detection is used to determine whether a channel is being occupied during the energy detection. The type of the energy detection includes energy detection not involving random back-off, energy detection involving random back-off and having a fixed contention window size, and energy detection involving random back-off and having a variable contention window size. The energy detection parameters have been described in detail in the first embodiment, which are not repeated here anymore.

The channel detecting unit 2002 may perform channel detection on each of carriers in the group of carriers. Preset channel detection time periods for multiple carriers have the same end time. In the embodiment, the end time may be for example a subframe starting boundary of a physical uplink shared channel (PUSCH).

Figure 11:
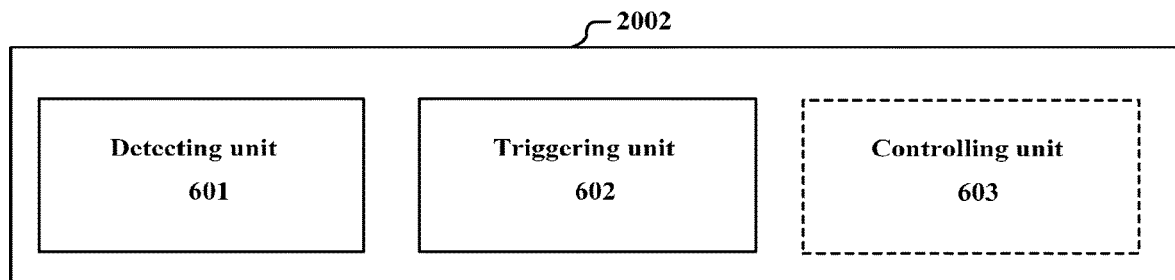
FIG. 11 is a structural block diagram of a channel detecting unit according to an embodiment of the present disclosure.

In an example, in order to reduce calculation complexity and lighten processing load, the channel detecting unit 2002 may perform cascaded detection on carriers in the group of carriers. As shown in FIG. 11, the channel detecting unit 2002 includes: a detecting unit 601, configured to perform channel detection of whether a channel being idle on a carrier; and a triggering unit 602, configured to, in a case that it is detected during the channel detection on a first carrier in each group of carriers that a channel is occupied, trigger the detecting unit 601 to perform channel detection on a second carrier other than the first carrier in the group of carriers. The "first" and "second" here are only used to distinguish different carriers, and do not represent a specific order. Functions of the detecting unit 601 and the triggering unit 602 are basically the same as those of the detecting unit 501 and the triggering unit 502 described in the second embodiment respectively. In the example, the channel detecting unit 2002 executes cascaded channel detection on each group of carriers respectively, and the user equipment would select a carrier, a channel detection result for which indicates that the corresponding channel is idle when the channel detection time period ends, so as to perform data transmission. Exemplarily, the channel detection on the first carrier is continued when channel detection on the second carrier is triggered. In this case, a duration of the channel detection on the second carrier is less than a duration of the channel detection on the first carrier, but the two durations have the same end time (in the embodiment, the end time is for example the subframe starting boundary of a PUSCH).

For example, in a case that the channel detection is the energy detection, the detecting unit 601 may be configured to determine that a carrier is occupied in a case that a value of energy accumulated in the energy detection on the carrier in a predetermined time period exceeds a threshold value for determining whether a channel is occupied in energy detection. The predetermined time period may be set to be for example 9 microseconds or longer.

In addition, as shown in a dashed line block in FIG. 11, the channel detecting unit 2002 may further include a control unit 603, configured to control the triggering unit 602 to trigger to perform channel detection on all carriers in each group of carrier sequentially, so that channel detection is performed on a next carrier only in a case that channel detection on a previous carrier indicates that the previous carrier is occupied, until a physical uplink shared channel (PUSCH) starts and all carriers in the group of carriers are traversed before the PUSCH starts. Before the PUSCH starts here means before the subframe starting boundary of the PUSCH. In the example, the channel detecting unit 2002 performs channel detection on all carriers in the group of carriers in a cascaded manner before the PUSCH starts, thereby reducing calculation amount required for the channel detection. In the example, channel detection on the carriers in each group of carriers has different start time, but has the same end time. In a case that a result of the channel detection at the end time indicates that multiple carriers are idle, one of the multiple carriers is selected for data transmission. For example, a primary carrier is selected in a case that the primary carrier is idle, and a secondary carrier is selected randomly or according to a predetermined rule in a case that the primary carrier is not idle. The predetermined rule may be determined based on a factor such as channel quality.

In addition, the control unit 603 may further determine a primary carrier and a secondary carrier in the group of carriers based on the carrier grouping information. The control unit 603 takes the primary carrier as the first carrier, and the triggering unit 602 triggers to perform channel detection on the secondary carriers sequentially in a case that the channel detection on the primary carrier indicates that the primary carrier is occupied. In other words, the control unit 603 controls to perform channel detection on the primary carrier first, and perform channel detection on the secondary carriers in a case that the channel detection on the primary carrier indicates that the primary carrier is occupied. An order of performing channel detection on the secondary carriers may be determined randomly, or may be determined by the control unit 603 based on for example a frequency band position or the like.

As described above, the channel detection on the primary carrier may be more complex than the channel detection on the secondary carrier, and the channel detection parameters for the primary carrier is set stricter than channel detection parameter for the secondary carrier. In a case that the channel detection is the energy detection, for example, a type of energy detection on the primary carrier may be energy detection involving random back-off, and a type of energy detection on the secondary carrier is energy detection not involving random back-off.

Figure 12:
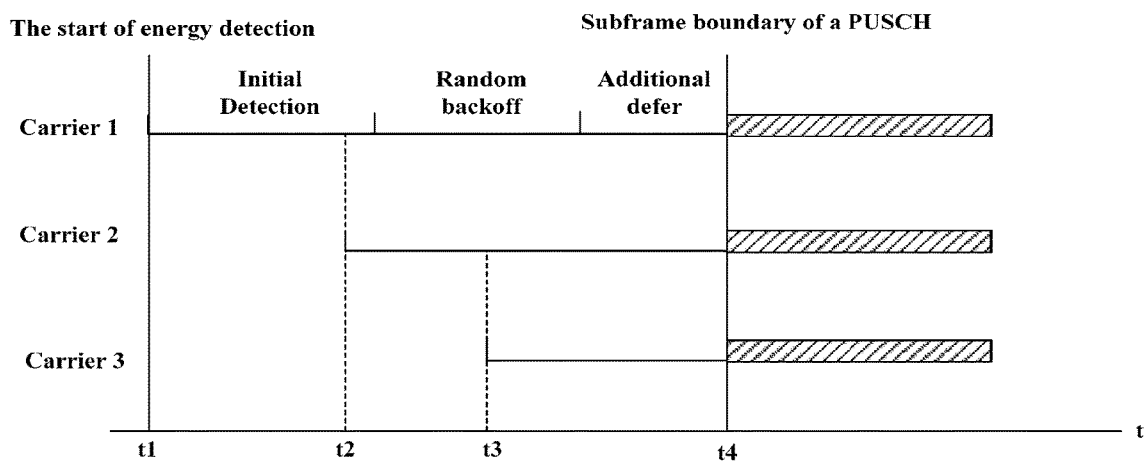
FIG. 12 shows an example of an operation of a channel detecting unit.
Figure 13:
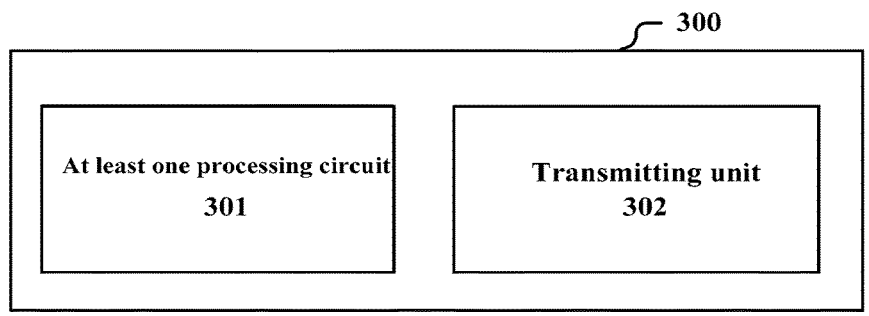
FIG. 13 is a structural block diagram of a spectrum management device according to an embodiment of the present disclosure.

The energy detection involving random back-off includes an initial detection phase, a random back-off phase and an additional defer phase. As shown in FIG. 12, energy detection on the primary carrier indicates that the primary carrier is occupied in one of the following cases: a case where energy detection in the initial detection stage indicates that a channel is not idle, a case where counting of a counter is interrupted in the random back-off stage, and a case where the energy detection in the additional defer stage indicates that a channel is not idle. In FIG. 12, since a value of energy accumulated from t1 to t2 in the initial detection phase already exceeds the related threshold value of energy detection, the primary carrier 1 is considered to be occupied at t2, and the triggering unit 602 triggers to perform energy detection on the secondary carrier 2. The carrier 2 is also considered to be occupied in a case that a value of energy accumulated from t2 to t3 exceeds the threshold value, and the triggering unit 602 triggers to perform energy detection on the secondary carrier 3. A minimum duration in which energy is accumulated for each carrier may be 9 microseconds, that is, whether the carrier is occupied can be determined after the duration.

As shown in a dashed line block in FIG. 8, the device 200 may further include: a transceiving unit 202, configured to receive at least one set of channel detection parameters to be used by the user equipment to perform channel detection, the carrier grouping information and the uplink scheduling grant from the base station. The transceiving unit 202 may receive the channel detection parameters, the carrier grouping information and the uplink scheduling grant in a licensed frequency band. Alternatively, the transceiving unit 202 may receive the uplink scheduling grant in the unlicensed frequency band.

The device 200 according to the embodiment may perform channel detection on carriers in the group of carriers based on the carrier grouping information, thereby improving a probability that an idle channel is detected and improving usage efficiency of resources of the unlicensed frequency band.

Fourth Embodiment

FIG. 12 is a block diagram of a spectrum management device 300 according to an embodiment of the present disclosure. As shown in FIG. 12, the spectrum management device 300 includes: at least one processing circuit 301 configured to group carriers in an unlicensed frequency band; and a transmitting unit 302, configured to transmit carrier grouping information on grouping of the carriers to a base station. The processing circuit 301 may be for example a central processing unit (CPU), a microprocessor, an integrated circuit module and the like having data processing capability.

As described above, the carriers may be grouped by the base station, or may also be grouped by the spectrum management device. In the embodiment, the spectrum management device 300 groups the carriers and transmits the carrier grouping information to each base station.

As an example, the processing circuit 301 may group the carriers based on at least one of a frequency band location of each carrier, a usage status of each carrier, an amount of data to be transmitted for each service of the user equipment, and information in a geographical location database. The usage status of each carrier may be stored in the spectrum management device 300. The amount of data to be transmitted for each service of the user equipment may be provided to the base station for example based on a buffer status report (BSR), and the base station reports the amount of data to the spectrum management device 300.

For example, in a case that the frequency band locations of two carriers are close or adjacent to each other, the two carriers may have similar channel characteristics, and therefore, the two carriers may be grouped into the same group. In addition, the usage status of the carrier indicates a load status on the carrier, for example, a carrier with light load may be selected to be grouped. In another aspect, for example, in a case that there is a large amount of data to be transmitted by the user equipment, a carrier with light load may be selected to be grouped. In addition, the processing circuit 301 may also take a geographical location of the user equipment into consideration by referring to information in the geographical location database. For example, in a case that user equipment which is using a carrier to perform data transmission is far away from user equipment for which uplink transmission resources are to be scheduled currently, the carrier may be selected.

In an example, the processing circuit 301 may select a primary carrier and then select a secondary carrier allocated to the primary carrier, to group the carriers. In a group of carriers, a priority level for the user equipment to use the primary carrier to perform data transmission is higher than a priority level for the user equipment to use the secondary carrier to perform data transmission. In practice, the processing circuit 301 may also group the carriers in another particular manner. For example, the carriers to be grouped into the same group are selected, and then a primary carrier and a secondary carrier are designated, which are not limited here.

The spectrum management device 300 according to the embodiment provides information on the grouping of carriers to the base station, thereby reducing processing load of the base station, and reducing signaling overhead due to not requiring to provide a usage status of the carrier to the base station.

Fifth Embodiment

Figure 14:
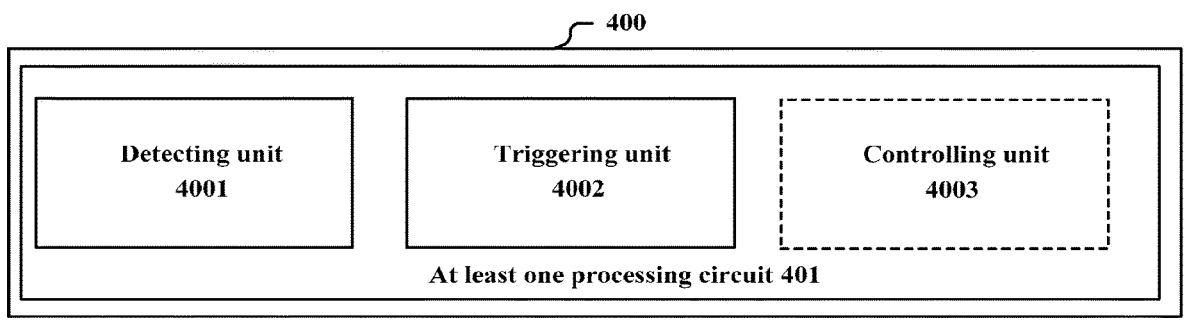
FIG. 14 is a structural block diagram of a channel detection device according to an embodiment of the present disclosure.

FIG. 14 shows a block diagram of a channel detection device 400 according to an embodiment of the present disclosure. The channel detection device is used to perform channel detection on multiple carriers in an unlicensed frequency band. As shown in FIG. 14, the channel detection device includes at least one processing circuit 401. The multiple carriers includes a first carrier and a second carrier, and the processing circuit 401 is configured to perform channel detection of whether a channel being idle on the first carrier, and trigger channel detection of whether a channel being idle on the second carrier in a case that it is detected during the channel detection on the first carrier that the channel is occupied.

In addition, FIG. 14 further shows an example of functional modules of the processing circuit 401. As shown in FIG. 14, the processing circuit 401 includes a detecting unit and a trigging unit 4002. The detecting unit 4001 is configured to perform channel detection of whether a channel being idle on a carrier. The triggering unit 4002 is configured to trigger the detecting unit 4001 to perform channel detection on the second carrier in a case that the channel detection on the first carrier by the detecting unit 4001 indicates that a channel is occupied. It should be understood that the functional modules may be implemented by processing circuits respectively, or may all be implemented by one processing circuit, or may be implemented as a part of a processing circuit. Alternatively, each functional module may be implemented by multiple processing circuits. In other words, implementation of the functional modules is not limited. The processing circuit 401 may be for example a central processing unit (CPU), a microprocessor, an integrated circuit module and the like having data processing ability. A structure and a function of the device 400 are described in detail below with reference to FIG. 14.

The channel detection device 400 triggers channel detection on a next carrier based on an indication that a channel is occupied during the channel detection on a previous carrier, and in this way, cascaded channel detection can be implemented, thereby reducing processing load of the channel detection. As shown in a dashed line block in FIG. 14, the processing circuit 401 may further include a control unit 4003 configured to, in a case that there are multiple carriers to be detected, control the triggering unit 4002 to trigger the detecting unit 4001 to perform channel detection on all carriers sequentially. Channel detection is performed on a next carrier only in a case that channel detection on a previous carrier indicates that a channel is occupied, until the plurality of carriers are traversed or a time period for channel detection is over. In this case, the previous carrier is equivalent to the first carrier and the next carrier is equivalent to the second carrier.

The time period for channel detection here is for example a preset channel detection time period. In a case that channel detection is performed on all carriers in parallel respectively, preset channel detection time periods for the carriers have the same end time. In a case that the channel detection is performed in a cascaded way in the embodiment, channel detection on all carriers has different start time, since a start time of the channel detection on the next carrier is later than a start time of the channel detection on the previous carrier. However, the channel detection on the carriers has the same end time. For uplink channel detection, the end time is for example a subframe starting boundary of a physical uplink shared channel. For downlink channel detection, the end time is for example a time when a downlink timeslot comes.

In an example, the multiple carriers are grouped into multiple groups of carriers, and the channel detection device 400 performs the cascaded channel detection described above on each group of carriers. Specifically, for each group of carriers, the control unit 4003 controls the triggering unit 4002 to trigger the detecting unit 4001 to perform channel detection on carriers in the group of carriers sequentially. Channel detection is performed on a next carrier only in a case that the channel detection on a previous carrier indicates that the channel is occupied, until all the carriers in the group of carriers are traversed or a time period for channel detection is over. Therefore, for each group of carriers, in a case that channel detection on one carrier in the group of carriers indicates that the channel is idle, the idle channel may be used for data transmission, thereby improving usage efficiency of resources of the unlicensed frequency band. In a case that there are multiple carriers in the group of carriers, channels corresponding to which are indicated to be idle during the channel detection, one carrier is selected from the multiple carriers randomly or according to a predetermined rule, for data transmission. The predetermined rule may be for example determined based on a factor such as channel quality.

In a case that user equipment includes the above channel detection device 400, if the user equipment receives uplink scheduling grants for multiple groups of carriers, the channel detection device 400 may perform the cascaded channel detection on each group of carriers. The user equipment transmits data with a carrier which is idle in the channel detection on each group of carriers at a time when a subframe starting boundary of the PUSCH starts.

In addition, the detecting unit 4001 may perform channel detection on different carriers using the same channel detection parameter or different channel detection parameters, which depends on actual requirements or setting.

The channel detection includes energy detection or characteristic detection. The energy detection refers to detecting whether there is a signal being transmitted on a channel, and the characteristic detection refers to detecting which type of communication device is occupying a channel. The characteristic detection includes preamble detection and PLMN+PSS/SSS detection. The preamble detection may be used to detect whether a WiFi signal is being transmitted, and the PLMN+PSS/SSS detection is used to detect whether there is an LTE signal and which type of LTE signal is being transmitted, which is applicable to the 4G Likewise, the channel detection described here is also applicable to the future 5G or a more advanced wireless communication system. In the following description, the energy detection is taken as an example, however, it should be understood that the technology is also applicable to the characteristic detection.

In a case that the channel detection is the energy detection, an energy detection parameter may include at least one of a type of energy detection and a threshold value of energy detection. The threshold value of the energy detection is used to determine whether a channel is occupied during the energy detection. The type of the energy detection includes energy detection not involving random back-off, energy detection involving random back-off and having a fixed contention window size and energy detection involving random back-off and having a variable contention window size. The energy detection parameter has been described in detail in the first embodiment, which is not repeated here anymore.

The detecting unit 4001 is configured to determine that a channel corresponding to a detected carrier is occupied, in a case that a value of energy accumulated in energy detection on the detected carrier in a predetermined time period exceeds a threshold value of energy detection for the detected carrier which is used to determine whether the channel is occupied. For example, predetermined time periods are different for different carriers, and/or predetermined time periods are different for different detection phases for the same carrier. Generally, accuracy of energy detection increases with an increase of the predetermined time period, and the setting of the predetermined time period is related to the energy detection parameter.

As an example, the energy detection involving random back-off includes an initial detection phase, a random back-off phase and an addition defer phase. It is indicated during the energy detection involving random back-off that the carrier is occupied in at least one case of the following cases: a case that energy detection in the initial detection phase indicates that the channel is not idle, a case that counting of the counter is interrupted in the random back-off phase, and a case that energy detection in the additional defer phase indicates that the channel is not idle. Specifically, as shown in FIG. 3, if a value of accumulated energy detected at a certain time of the initial detection phase exceeds a threshold value, it is determined that the channel is occupied. In this case, the triggering unit 4002 may trigger the detecting unit 4001 to detect a next carrier. In another aspect, if it is detected in the initial detection phase that the channel is not occupied, the channel detection proceeds to the random back-off phase. A random back-off counter is set based on a contention window size (CWS). The counting of the random back-off counter is interrupted in a case that the energy detection indicates that the channel is occupied. In this case, the triggering unit 4002 may trigger the detecting unit 4001 to detect a next carrier. It can be seen in the example that the predetermined time periods during which the energy is accumulated may be set to be different from each other in the initial detection phase and in the random back-off phase.

In another example, each group of carriers includes a primary carrier and a secondary carrier. In a group of carriers, a priority level to use the primary carrier to perform data transmission is higher than a priority level to use the secondary carrier to perform data transmission. For each group of carriers, the control unit 4003 controls the triggering unit 4002 to trigger the detecting unit 4001 to perform channel detection on the primary carrier and the secondary carrier sequentially, until all carriers in the group of carriers are traversed or a time period for channel detection is over. That is, the channel detection device 400 performs channel detection on the primary carrier first, and then performs channel detection on the secondary carrier only in a case that the channel detection on the primary carrier indicates that the channel is occupied.

In a case that the channel detection on the primary carrier indicates that the channel is occupied, and the subsequent channel detection on one of the secondary carriers indicates that the channel is idle, the control unit 4003 selects the secondary carrier corresponding to the idle channel for data transmission. Different types of energy detection may be performed on the primary carrier and the secondary carrier. For example, a type of energy detection on the primary carrier is the energy detection involving random back-off, and a type of energy detection on the secondary carrier is the energy detection not involving random back-off.

The above channel detection device 400 may be used for detecting an uplink channel, or may be used for detecting a downlink channel. The carriers are detected in a cascaded way, thereby effectively reducing processing load of the channel detection. The channel detection device 400 may be applied to each device according to the first embodiment to the third embodiment.

In addition, user equipment including the channel detection device 400 and a base station including the channel detection device 400 are further provided according to the embodiment.

Sixth Embodiment

In the process of describing the device for a wireless communication system and the channel detection device in the embodiments described above, obviously, some processing and methods are also disclosed. Hereinafter, an overview of the methods is given without repeating some details disclosed above. However, it should be noted that, although the methods are disclosed in a process of describing the device for a wireless communication system and the channel detection device, the methods do not certainly employ or are not certainly executed by the aforementioned components. For example, the embodiments of the device for a wireless communication system and the channel detection device may be partially or completely implemented with hardware and/or firmware, the method for wireless communications described below may be executed by a computer-executable program completely, although the hardware and/or firmware of the device for a wireless communication system and the channel detection device can also be used in the methods.

Figure 15:
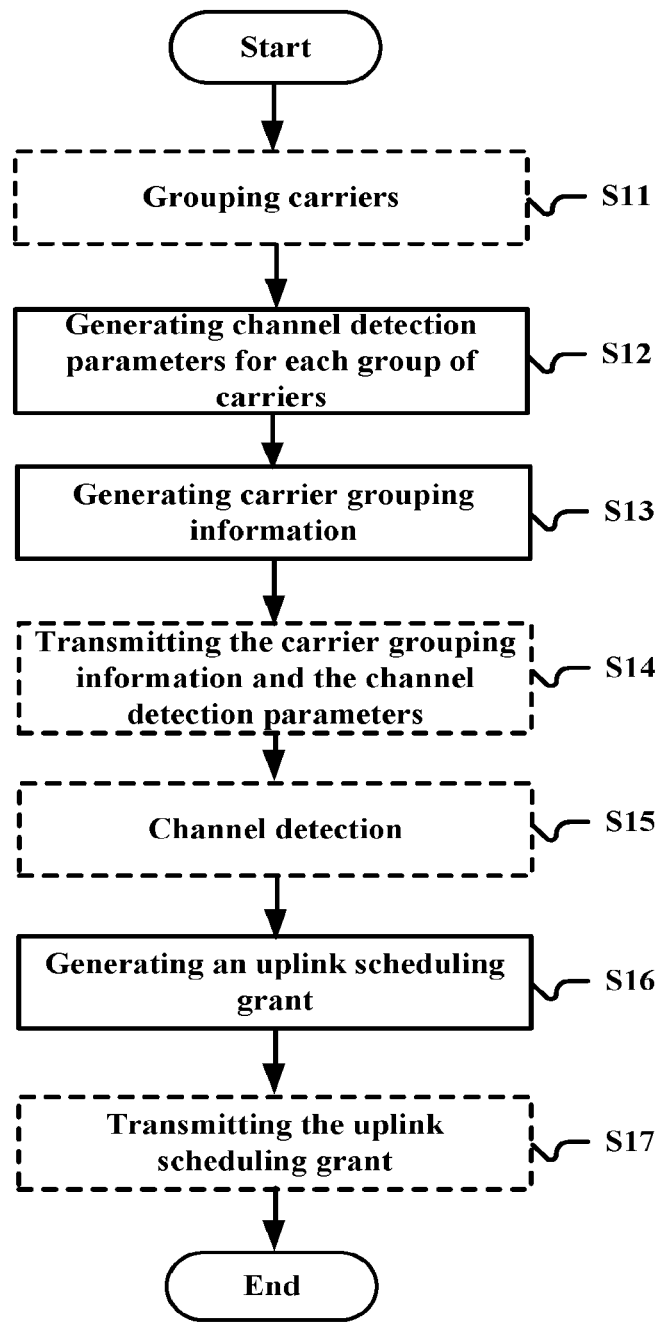
FIG. 15 is a flowchart of a method for wireless communications according to an embodiment of the present disclosure.

FIG. 15 is a flow diagram of a method for wireless communications according to an embodiment of the present disclosure, and the method includes: for at least one group of carriers in an unlicensed frequency band, generating at last one set of channel detection parameters for use by user equipment to detect whether a channel is idle (S12), wherein the at least one group of carriers are acquired by grouping at least a part of carriers in the unlicensed frequency band; generating carrier grouping information indicating a result of the grouping of the carriers (S13); and generating an uplink scheduling grant for the at least one group of carriers (S16).

In step S12, the same channel detection parameter or different channel detection parameters may be generated for all carriers in each group of carriers. In an example, each group of carriers includes a primary carrier and a secondary carrier. In a group of carriers, a priority level for the user equipment to use the primary carrier to perform data transmission is higher than a priority level for the user equipment to use the secondary carrier to perform data transmission. In this case, a channel detection parameter for the primary carrier may be different from a channel detection parameter for the secondary carrier. For example, the channel detection on the primary carrier is more complex than channel detection on the secondary carrier, and the channel detection parameter for the primary carrier is set stricter than the channel detection parameter for the secondary carrier. The carrier grouping information generated in step S13 may include for example information indicating a group to which a carrier belongs, and information indicating whether the carrier is a primary carrier or a secondary carrier in the group. In this way, the user equipment may determine other carriers which are in the same group as the carrier based on the carrier.

In step S12, at least one set of channel detection parameters may be generated for each of the user equipment, alternatively, at least one set of channel detection parameters which are commonly used by user equipment in a cell is generated for the cell.

Detection of whether a channel being idle may include energy detection. The channel detection parameters include for example at least one of a type of energy detection and a threshold value of energy detection. The threshold value of the energy detection is used to determine whether a channel is occupied during the energy detection. The type of energy detection may include energy detection not involving random back-off, energy detection involving random back-off and having a fixed contention window size, and energy detection involving random back-off and having a variable contention window size. In addition, detection of whether the channel being idle may also include characteristic detection. The characteristic detection includes for example preamble detection and PLMN+PSS/SSS.

The uplink scheduling grant generated for each group of carriers in step S16 is valid for all carriers in the group of carriers.

In addition, as shown in dashed line block in FIG. 5, the above method may further include a step S11: grouping carriers in unlicensed frequency band. For example, in step S11, the carriers may be grouped based on at least one of a frequency band location of each carrier, a usage status of each carrier, an amount of data to be transmitted for each service of the user equipment, and information in a geographical location database. The usage status of each carrier may be obtained for example by at least one of the following manners: being measured by the base station, being provided by a related spectrum management device, or being provided by a related geographical location database.

In step S11, a primary carrier may be selected and then a secondary carrier allocated to the primary carrier may be selected, for grouping the carriers. In practice, the carriers may be grouped in other manners.

In addition, as shown in a dashed line block in FIG. 15, the above method may further include a step S14: transmitting the carrier grouping information and the channel detection parameters to the user equipment. The carrier grouping information and the channel detection parameters are transmitted to the user equipment in a licensed frequency band. The above method further includes a step S17: transmitting the uplink scheduling grant to the user equipment. The uplink scheduling grant may be transmitted to the user equipment in the licensed frequency band.

In an example, step S17 may include transmitting the uplink scheduling grant to the user equipment in the unlicensed frequency band. In this case, the above method further includes a step S15, detecting whether a channel in the unlicensed frequency band is idle. Although not shown in FIG. 15, the above method may further include generating channel detection parameters used in channel detection for each group of carriers, before performing step S15. In step S15, channel detection can be performed on all carriers in each group of carriers respectively. In addition, step S15 may also be performed before step S11, that is, channel detection is performed on multiple carriers for example all carriers in the unlicensed frequency band before grouping the carriers in the unlicensed frequency band. A carrier which is indicated to be idle in the channel detection is selected in a subsequent step to transmit the uplink scheduling grant.

In an example, step S15 may also be implemented as: performing channel detection on a first carrier in each group of carriers; and performing channel detection on a second carrier other than the first carrier in the group of carriers in a case that it is detected during the channel detection on the first carrier that a channel is occupied. Step S15 may further include: triggering channel detection on all carriers in each group of carriers sequentially, so that channel detection is performed on a next carrier only in a case that channel detection on a previous carrier indicates that the previous carrier is occupied, until a downlink timeslot comes or all carriers in the group of carriers are traversed.

In the above method, the carriers are grouped, and each group of carriers rather than a single carrier is scheduled, thereby improving usage efficiency of resources in the unlicensed frequency band, and multiple carriers are scheduled for the user equipment, thereby improving communication quality and capacity.

Figure 16:
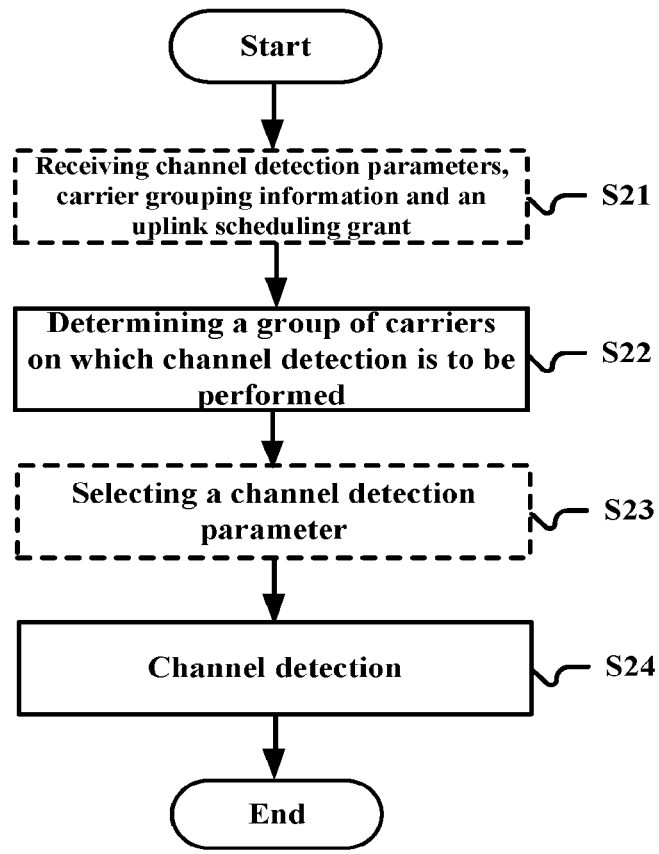
FIG. 16 is a flowchart of a method for wireless communications according to an embodiment of the present disclosure.

FIG. 16 shows a flow diagram of a method for wireless communications according to an embodiment of the present disclosure. The method includes: determining, based on carrier grouping information for an unlicensed frequency band and an uplink scheduling grant for the unlicensed frequency band received from a base station, a group of carriers on which channel detection is to be performed (S22); and performing channel detection on a carrier in the determined group of carriers using channel detection parameters received from the base station (S24).

The channel detection performed in step S24 may be energy detection, and the channel detection parameter may include at least one of a type of energy detection and a threshold value of energy detection. The threshold value of the energy detection is used to determine whether a channel is occupied during the energy detection. The type of energy detection may include energy detection not involving random back-off, energy detection involving random back-off and having a fixed contention window size and energy detection involving random back-off and having a variable contention window size.

In addition, as shown in a dashed line block in FIG. 16, the above method may further include a step S21: receiving, from the base station, at least one set of channel detection parameters to be used by user equipment to perform the channel detection, the carrier grouping information and the uplink scheduling grant. The channel detection parameters, the carrier grouping information and the uplink scheduling grant may be received in the licensed frequency band. Alternatively, the uplink scheduling grant may be received in the unlicensed frequency band.

The above method may further include a step S23: selecting a set of channel detection parameters from among the at least one set of channel detection parameters based on a priority level of a service of the user equipment, to perform the channel detection.

In step S24, channel detection may be performed on all carriers in each group of carriers respectively. In addition, step S24 may also be implemented as: for each group of carriers, performing channel detection on a first carrier in the group of carriers; and triggering to perform energy detection on a second carrier, in a case that it is detected during the channel detection on the first carrier that a channel is occupied. Step S24 may further include: for each group of carriers, triggering to perform channel detection on all carriers in the group of carriers sequentially, so that channel detection is performed on a next carrier only in a case that the channel detection on a previous carrier indicates that the previous carrier is occupied, until a physical uplink shared channel (PUSCH) starts and all the carriers in the group of carriers are traversed before the PUSCH starts.

In addition, a primary carrier and a secondary carrier in the group of carriers may be determined based on the carrier grouping information in step S24. In a group of carriers, a priority level for the user equipment to use the primary carrier to perform data transmission is higher than a priority level for the user equipment to use the secondary carrier to perform data transmission. The primary carrier is taken as the first carrier, and channel detection on the secondary carriers is triggered sequentially in a case that the channel detection on the primary carrier indicates that the primary carrier is occupied.

As an example, the channel detection is energy detection, a type of the energy detection on the primary carrier is energy detection involving random back-off, and a type of the energy detection on the secondary carrier is energy detection not involving random back-off. The energy detection involving the random back-off includes an initial detection phase, a random back-off phase and an additional defer phase. The energy detection on the primary carrier indicates that the primary carrier is occupied in at least one of the following cases: a case where energy detection in the initial detection stage indicates that a channel is not idle, a case where counting of a counter is interrupted in the random back-off stage, and a case where the energy detection in the additional defer stage indicates that a channel is not idle. In the channel detection, in a case that a value of energy accumulated by the energy detection on a carrier in a predetermined time period exceeds a threshold value for determining whether the channel is occupied in the energy detection, it is determined that the carrier is occupied.

In the method, the user equipment may perform channel detection on carriers in the group of carriers based on the carrier grouping information, thereby improving a probability that an idle channel is detected, and improving usage efficiency of resources in the unlicensed frequency band.

Figure 17:
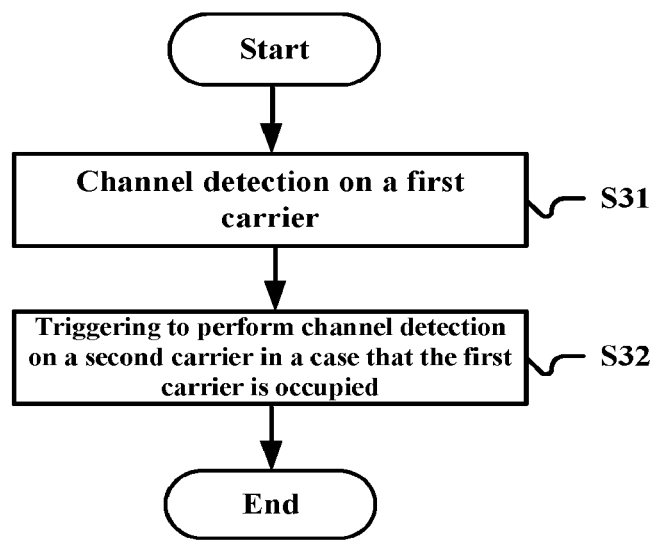
FIG. 17 is a flowchart of a channel detection method according to an embodiment of the present disclosure.

FIG. 17 shows a channel detection method for performing channel detection on multiple carriers in an unlicensed frequency band according to an embodiment of the present disclosure. The multiple carriers include a first carrier and a second carrier. The method includes: performing channel detection of whether a channel being idle on the first carrier (S31); and triggering channel detection of whether a channel being idle on the second carrier in a case that it is detected during channel detection on the first carrier that the channel is occupied (S32).

The above method further includes performing channel detection on all carriers of the multiple carriers sequentially. Channel detection is performed on a next carrier only in a case that channel detection on a previous carrier indicates that the channel is occupied, until the multiple carriers are traversed or a time period for channel detection ends.

In an example, multiple carriers are grouped into multiple groups of carriers, and each group of carriers includes a primary carrier and a secondary carrier. A priority level of using the primary carrier to perform data transmission is higher than a priority level of using the secondary carrier to perform data transmission. Channel detection is performed on the primary carrier and all secondary carriers in each group of carriers sequentially, until all carriers in the group of carriers are traversed or a time period for channel detection ends.

When channel detection on the primary carrier indicates that the channel is occupied, and channel detection on one of the secondary carriers indicates that the channel is idle, the secondary carrier corresponding to the idle channel is selected to perform data transmission.

The channel detection may be energy detection. In a case that a value of energy accumulated in energy detection on the detected carrier in a predetermined time period exceeds a threshold value of energy detection for the detected carrier which is used to determine whether the channel is occupied, it is determined that the channel corresponding to the carrier is occupied. The predetermined time periods are different for different carriers, and/or the predetermined time periods are different for different detection phases for the same carrier.

An energy detection parameter may include at least one of a type of energy detection and a threshold value of energy detection. The threshold value of the energy detection is used to determine whether a channel is occupied during the energy detection. The type of the energy detection may include energy detection not involving random back-off, energy detection involving random back-off and having a fixed contention window size, and energy detection involving random back-off and having a variable contention window size. Channel detection parameters may be the same or different for the different carriers. For example, a type of energy detection on the primary carrier is energy detection involving random back-off, and a type of energy detection on the secondary carrier is energy detection not involving random back-off.

In an example, the energy detection involving random back-off includes an initial detection phase, a random back-off phase and an additional defer phase. It is indicated during the energy detection involving random back-off that the carrier is occupied in at least one of the following cases: a case that energy detection in the initial detection phase indicates that the channel is not idle, a case that counting of the counter is interrupted in the random back-off phase, and a case that energy detection in the additional defer phase indicates that the channel is not idle.

In the method, the carriers are detected in a cascaded manner, thereby effectively reducing processing load of channel detection.

It is to be noted that, the above methods can be used separately or in conjunction with each other. The details have been described in detail in the first to fifth embodiments, and are not repeatedly described here.

Figure 18:
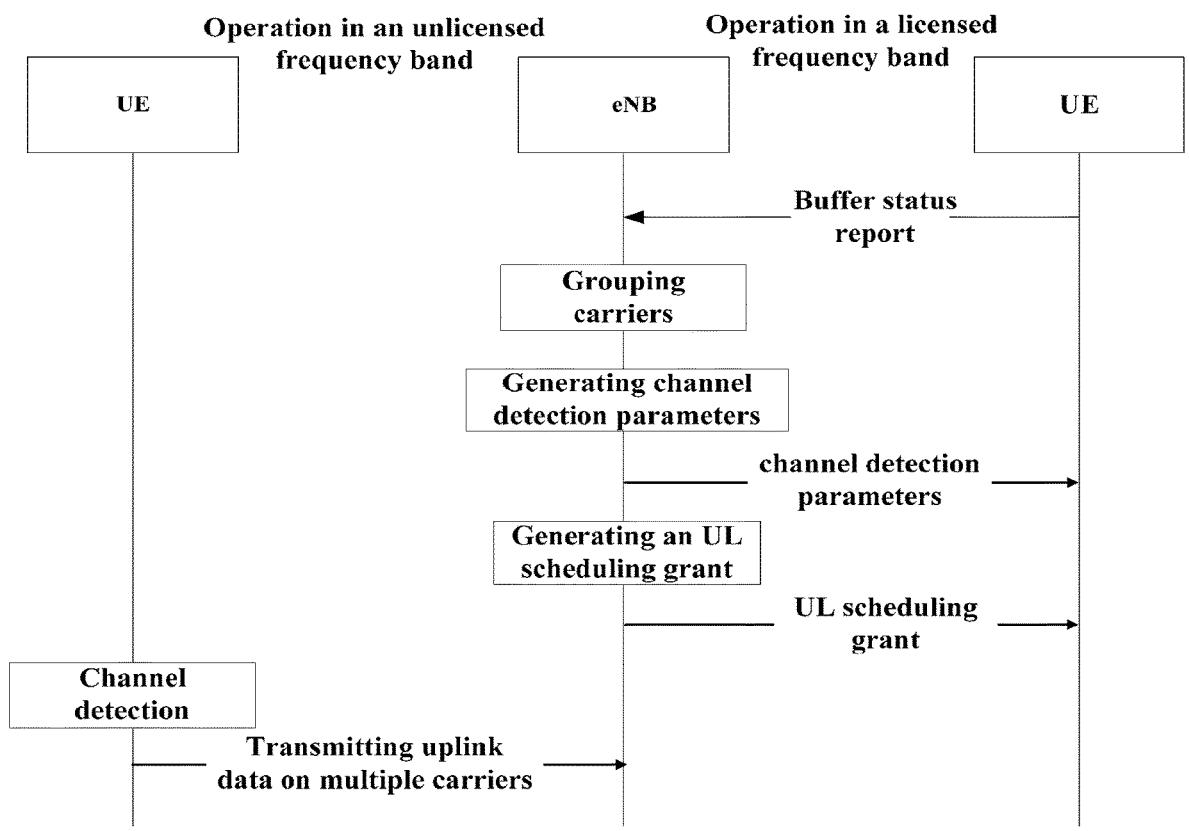
FIG. 18 shows an example of an information flow between a base station and a user equipment.
Figure 19:
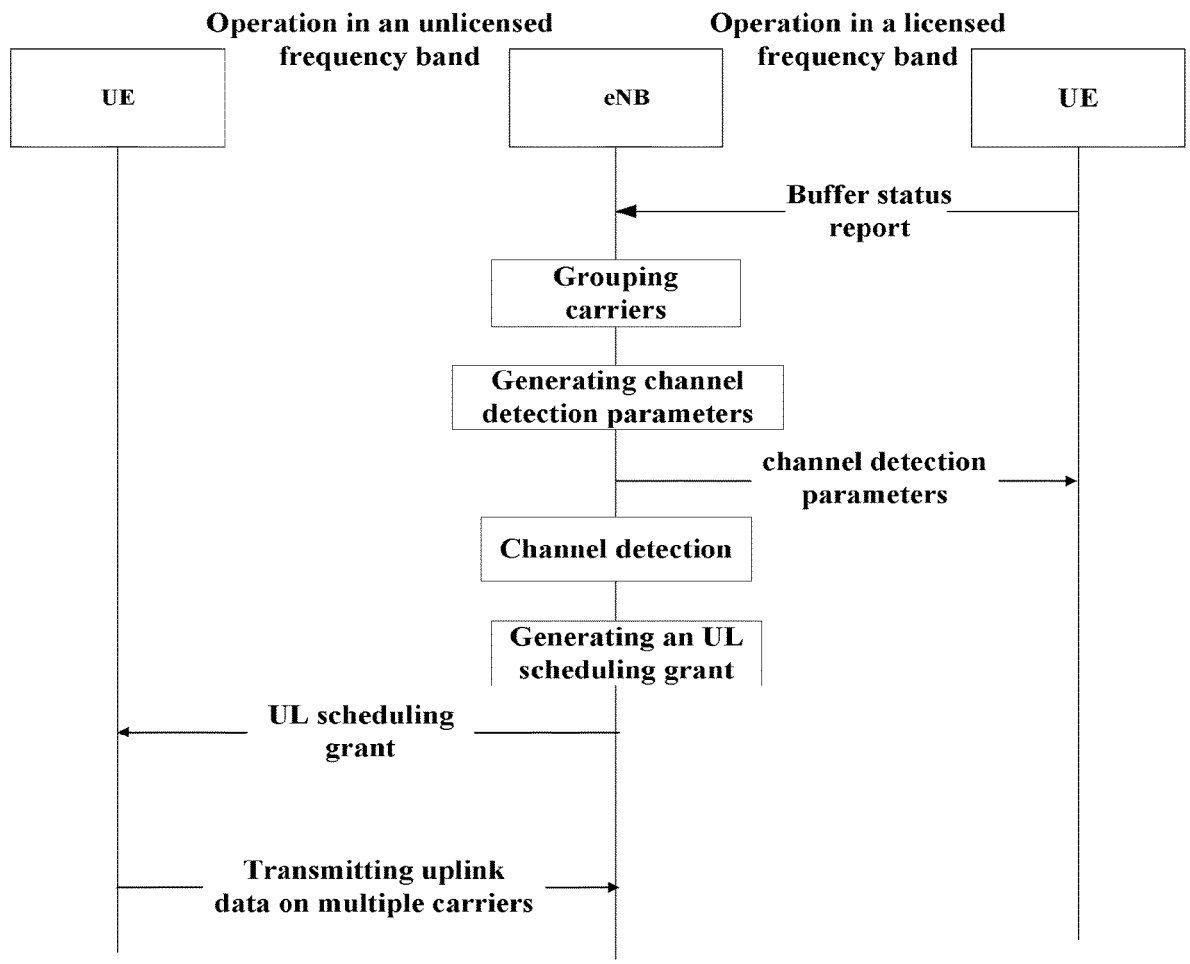
FIG. 19 shows another example of an information flow between a base station and a user equipment.

For convenience of understanding, FIG. 18 and FIG. 19 show examples of an information procedure between a base station and one of the user equipment. The base station (eNB) includes for example a device 100, the user equipment (UE) includes for example a device 200. It should be understood that the information procedure is not limited. It should be noted that although two UEs are shown at the left side and the right side, the two UEs are the same UE substantively. Such an illustration is just to distinguish whether a licensed frequency or an unlicensed frequency is used in communication between the eNB and the UE.

FIG. 18 shows an example of an information procedure for cross-carrier scheduling. In FIG. 18, the UE transmits data in an unlicensed frequency band, and the UE transmits a request to the eNB and transmits a buffer status report (BSR). The BSR indicates the amount of data to be transmitted by the UE or a priority level. Upon receiving the BSR, the eNB determines that the UE is to perform uplink transmission on two carriers. The eNB groups the carriers, for example, carriers 1 to 6 are selected to be grouped into two groups {1, 2, 3} and {4, 5, 6}. The eNB generates channel detection parameters such as energy detection parameters for each group of carriers, and transmits the channel detection parameters along with carrier grouping information (not shown in FIG. 18) to the UE. The eNB transmits two generated uplink (UL) scheduling grants (corresponding to the groups of carriers {1, 2, 3} and {4, 5, 6} respectively) to the user equipment. The above communication is performed in the licensed frequency band. Upon receiving the uplink scheduling grants, the UE performs channel detection on the scheduled group of carriers based on the carrier grouping information and the uplink scheduling grants. In a case that at least one carrier is idle in each group of carriers, the UE performs data transmission on the selected idle carrier. The UE performs channel detection for example with the cascaded channel detection method described above.

FIG. 19 shows an example of an information procedure of self-carrier scheduling. A difference of FIG. 19 from FIG. 18 is in that the eNB performs channel detection on each group of carriers after grouping the carriers, and transmits the UL scheduling grants on a carrier, which is indicated to be idle in the channel detection, in the unlicensed frequency band.

The eNB may also perform channel detection for example with the cascaded channel detection method described above.

Figure 20:
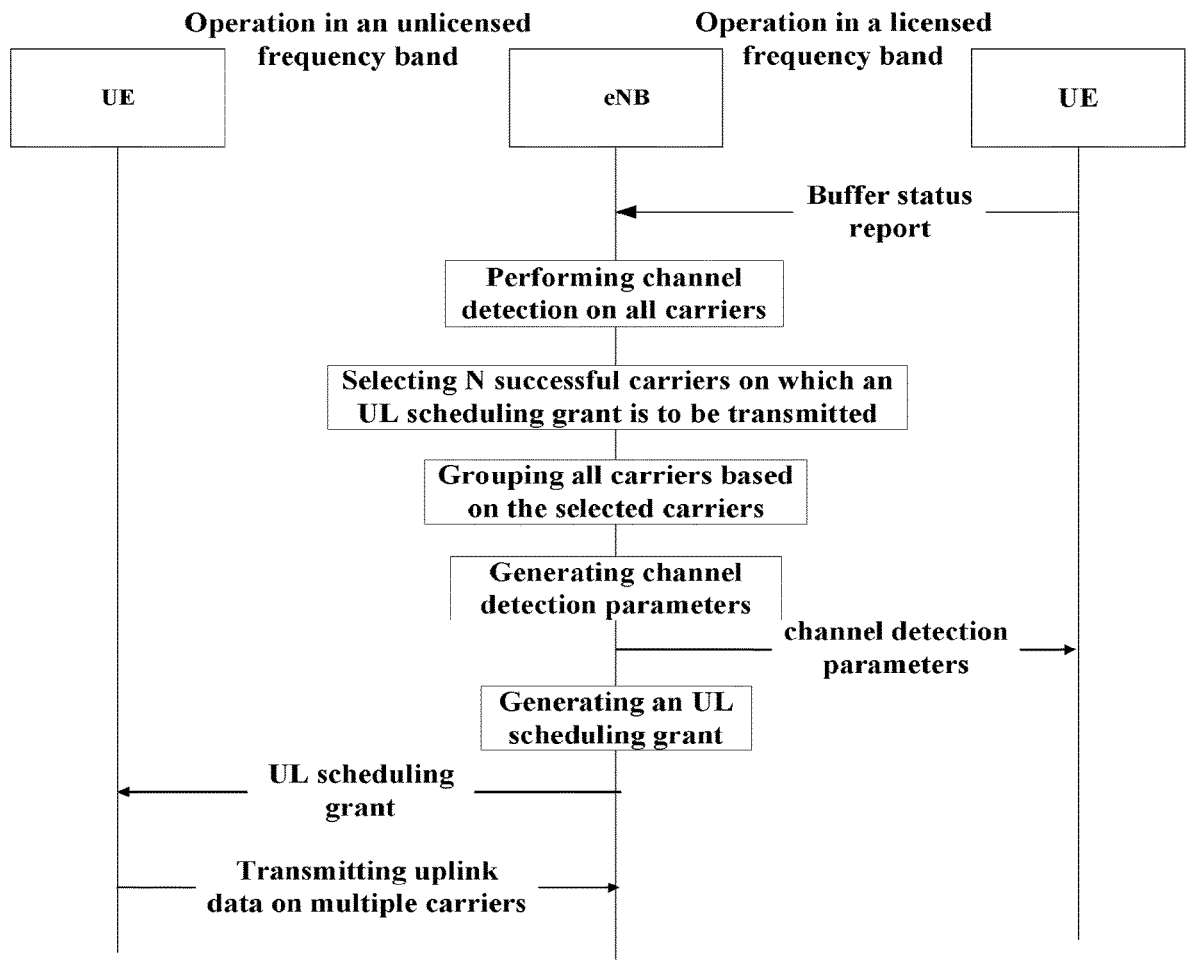
FIG. 20 shows another example of an information flow between a base station and a user equipment.

In addition, FIG. 20 shows another example of an information procedure of self-carrier scheduling. A difference of FIG. 20 from FIG. 19 is in that the eNB performs channel detection on all carriers and groups the carriers based on a result of the channel detection. Specifically, the eNB selects N (N is the number of carriers to be scheduled for the UE by the eNB) carriers which are indicated to be idle in the channel detection and groups the N carriers, and transmits an UL scheduling grant corresponding to a group of carriers on the carrier. Similarly, the eNB transmits channel detection parameters for each group of carriers in the licensed frequency band before transmitting the uplink scheduling grant.

APPLICATION EXAMPLE

The technology in the present disclosure can be applied into various products. For example, the spectrum management device 300 may be implemented as any type of servers, such as a tower server, a rack mounted server and a blade server. The spectrum management device 300 may be a control module (such as an integrated circuit module including a single wafer, and a card or blade (blade) inserted into a slot of the blade server) mounted on a server.

In addition, a base station described above can be implemented as any type of evolved node B (eNB), such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communications; and one or more remote radio heads (RRHs) arranged in a different position from the body. In addition, various types of terminals described below may operate as a base station by temporarily or semi-persistently executing the function of the base station.

[Application Example Regarding Base Station]

First Application Example

Figure 21:
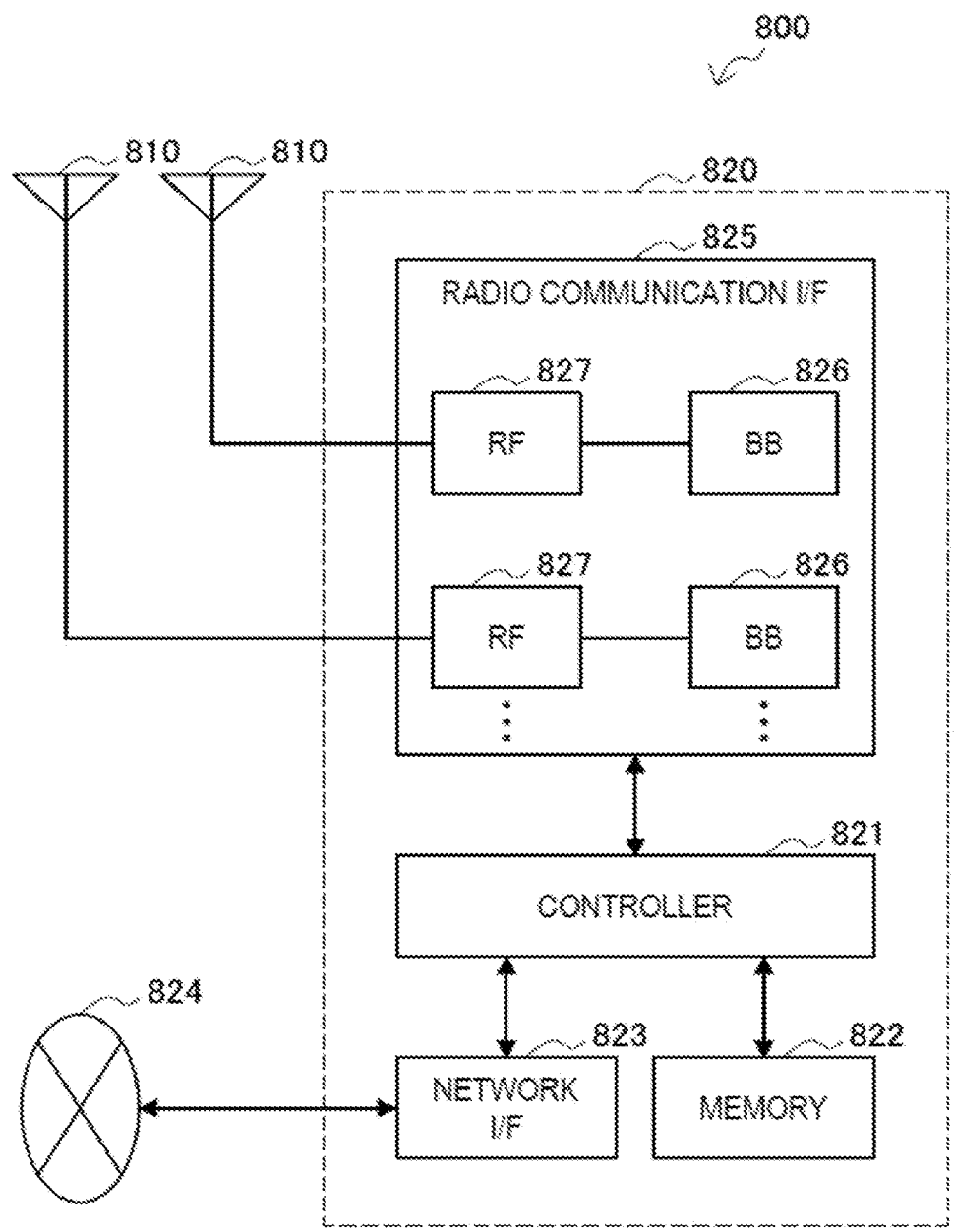
FIG. 21 is a block diagram illustrating a first example of a schematic configuration of an evolved Node B (eNB) to which the technology of the present disclosure may be applied.

FIG. 21 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 20. For example, the multiple antennas 810 may be compatible with multiple frequency bands used by the eNB 800. Although FIG. 21 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 21. For example, the multiple BB processors 826 may be compatible with multiple frequency bands used by the eNB 800. The radio communication interface 825 may include the multiple RF circuits 827, as illustrated in FIG. 21. For example, the multiple RF circuits 827 may be compatible with multiple antenna elements. Although FIG. 21 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 21, the transceiving unit 102 described with reference to FIG. 1 may be implemented by the radio communication interface 825. At least a part of the functions may be implemented by the controller 821. For example, the controller 821 may execute the uplink scheduling grant for each group of carriers by executing the function of the processing circuit 101.

(Second Application Example)

Figure 22:
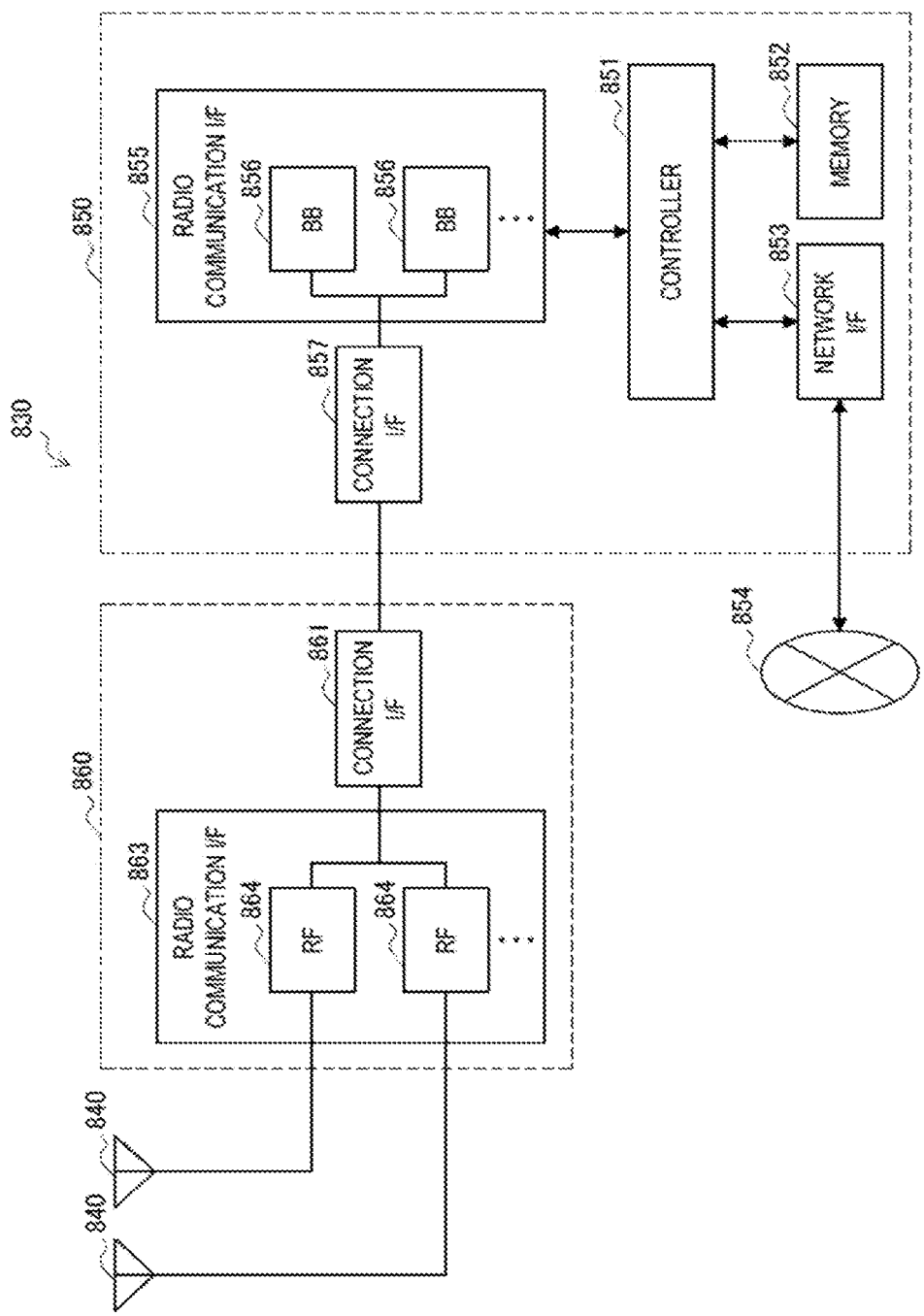
FIG. 22 is a block diagram illustrating a second example of a schematic configuration of an eNB to which the technology of the present disclosure may be applied.

FIG. 22 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 22. For example, the multiple antennas 840 may be compatible with multiple frequency bands used by the eNB 830. Although FIG. 22 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 21.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 21, except the BB processor 856 is connected to the RF circuit 864 of the RRH 860 via the connection interface 857. The radio communication interface 855 may include the multiple BB processors 856, as illustrated in FIG. 22. For example, the multiple BB processors 856 may be compatible with multiple frequency bands used by the eNB 830. Although FIG. 22 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 22. For example, the multiple RF circuits 864 may support multiple antenna elements. Although FIG. 22 illustrates the example in which the radio communication interface 863 includes the multiple RF circuits 864, the radio communication interface 863 may also include a single RF circuit 864.

In the eNB 830 shown in FIG. 22, the transceiving unit 102 described with reference to FIG. 1 may be implemented by the radio communication interface 855 and/or the radio communication interface 863. At least a part of functions may be implemented by the controller 851. For example, the controller 851 may execute the uplink scheduling grant for each group of carriers by executing the function of the processing circuit 101.

[Application Example Regarding User Equipment]

First Application Example

Figure 23:
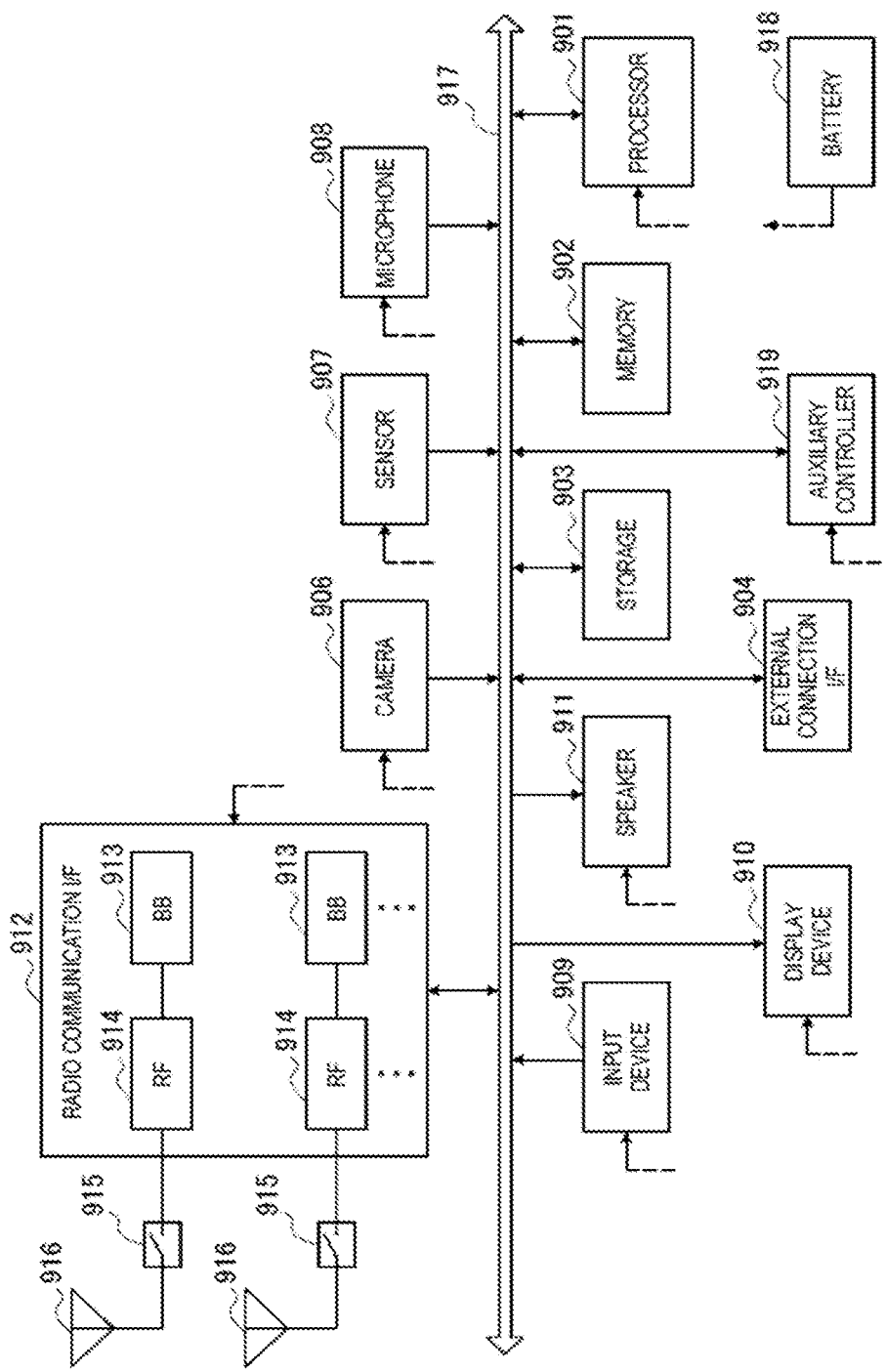
FIG. 23 is a block diagram illustrating an example of a schematic configuration of a smart phone to which the technology of the present disclosure may be applied.

FIG. 23 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LET and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may be a one chip module having the BB processor 913 and the RF circuit 914 integrated thereon. The radio communication interface 912 may include the multiple BB processors 913 and the multiple RF circuits 914, as illustrated in FIG. 23. Although FIG. 23 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 23. Although FIG. 23 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 23 via feeder lines, which are partially shown as dashed lines in the figure. The auxiliary controller 919 operates a minimum necessary function of the smartphone 900, for example, in a sleep mode.

In the smart phone 900 shown in FIG. 23, the transceiving unit 201 described with reference to FIG. 8 may be implemented by the radio communication interface 912. At least a part of functions may also be realized by the processor 901 or the auxiliary controller 919. For example, the processor 901 or the auxiliary controller 919 may perform channel detection on the group of carriers rather than a single carrier by executing the function of the processing circuit 201, thereby improving resource usage efficiency in the unlicensed frequency band.

(Second Application Example)

Figure 24:
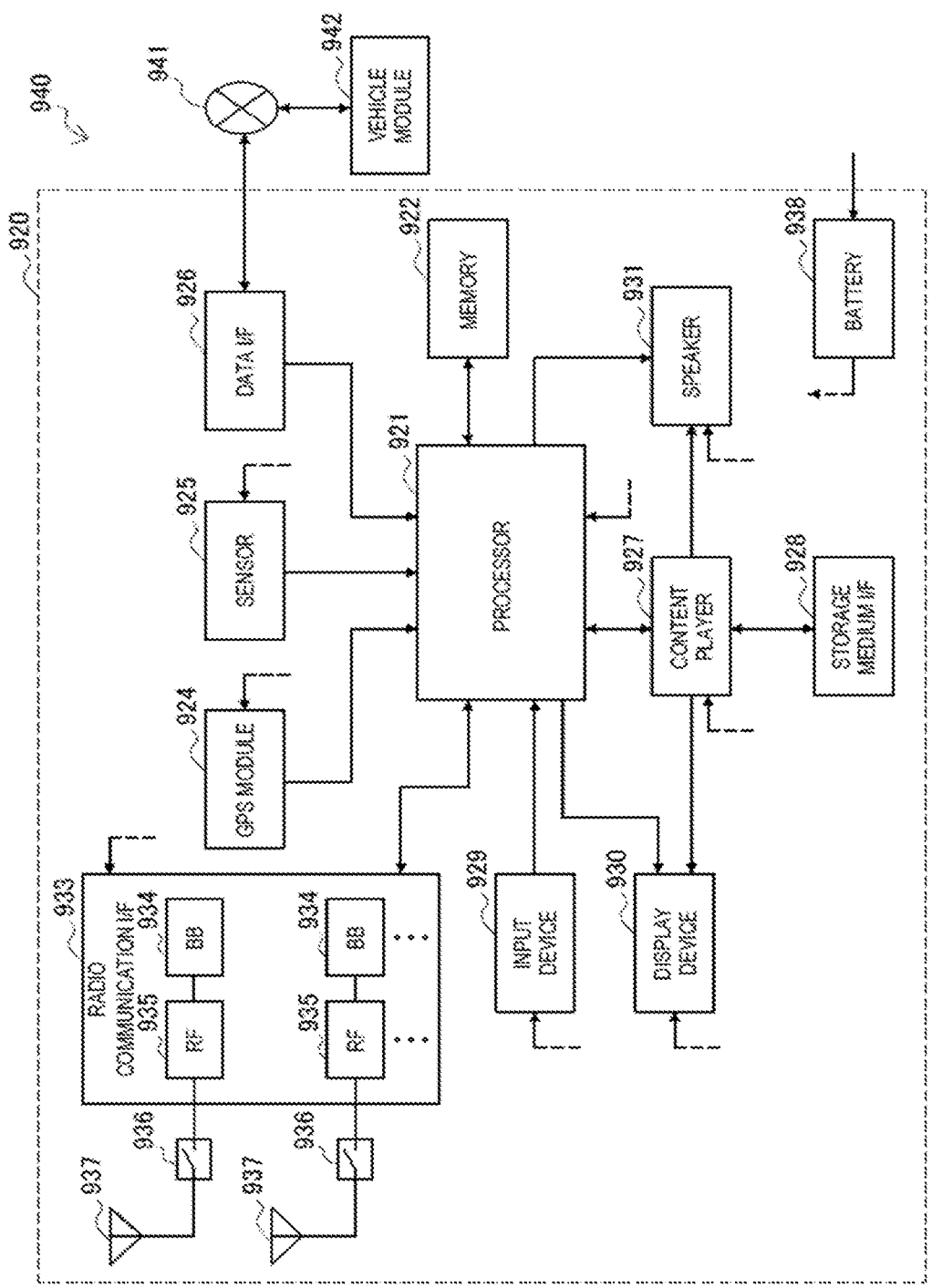
FIG. 24 is a block diagram illustrating an example of a schematic configuration of an car navigation device to which the technology of the present disclosure may be applied.

FIG. 24 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LTE and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may also be a one chip module that has the BB processor 934 and the RF circuit 935 integrated thereon. The radio communication interface 933 may include the multiple BB processors 934 and the multiple RF circuits 935, as illustrated in FIG. 24. Although FIG. 24 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 24. Although FIG. 24 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 24 via feeder lines that are partially shown as dashed lines in the figure. The battery 938 accumulates power supplied form the vehicle.

In the car navigation apparatus 920 shown in FIG. 24, the transceiving unit 201 described with reference to FIG. 8 may be implemented by the radio communication interface 933. At least a part of functions may also be realized by the processor 921. For example, the processor 921 may perform channel detection on the group of carriers rather than a single carrier by executing the function of the processing circuit 201, thereby improving resource usage efficiency in the unlicensed frequency band.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 2500 shown in FIG. 25) from a storage medium or network, wherein the computer is capable of implementing various functions when installed with various programs.

Figure 25:
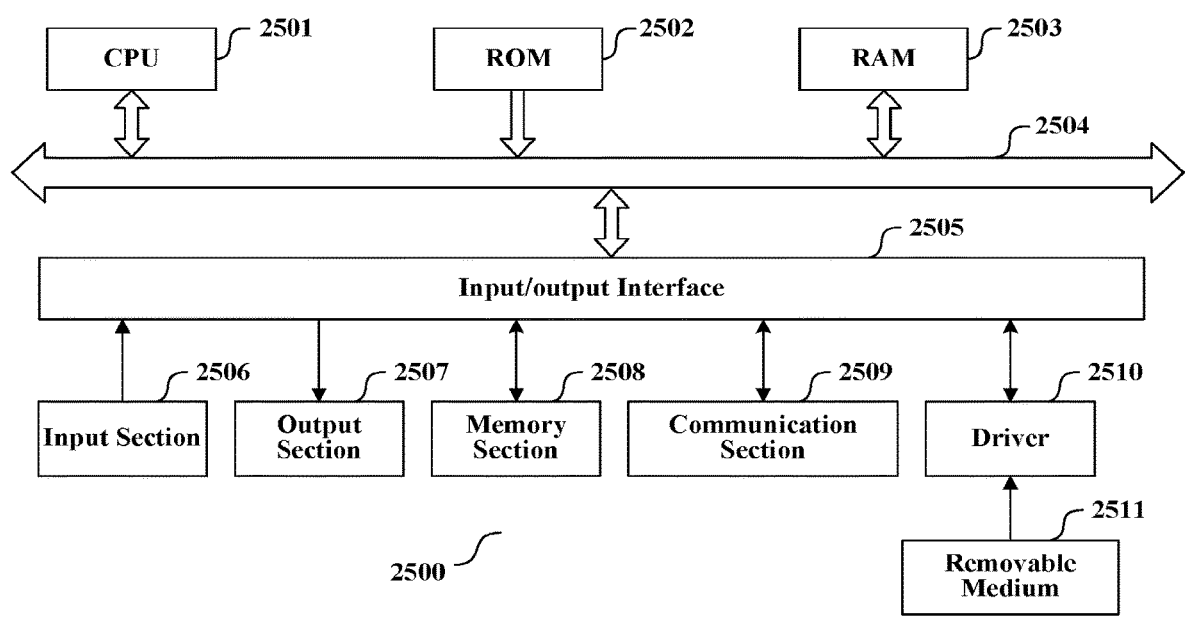
FIG. 25 is a block diagram of an exemplary block diagram illustrating the structure of a general purpose personal computer capable of realizing the method and/or device and/or system according to the embodiments of the present invention.

In FIG. 25, a central processing unit (CPU) 2501 executes various processing according to a program stored in a read-only memory (ROM) 2502 or a program loaded to a random access memory (RAM) 2503 from a memory section 2508. The data needed for the various processing of the CPU 2501 may be stored in the RAM 2503 as needed. The CPU 2501, the ROM 2502 and the RAM 2503 are linked with each other via a bus 2504. An input/output interface 2505 is also linked to the bus 2504.

The following components are linked to the input/output interface 2505: an input section 2506 (including keyboard, mouse and the like), an output section 2507 (including displays such as a cathode ray tube (CRT), a liquid crystal display (LCD), a loudspeaker and the like), a memory section 2508 (including hard disc and the like), and a communication section 2509 (including a network interface card such as a LAN card, modem and the like). The communication section 2509 performs communication processing via a network such as the Internet. A driver 2510 may also be linked to the input/output interface 2505. If needed, a removable medium 2511, for example, a magnetic disc, an optical disc, a magnetic optical disc, a semiconductor memory and the like, may be installed in the driver 2510, so that the computer program read therefrom is installed in the memory section 2508 as appropriate.

In the case where the foregoing series of processing is achieved by software, programs forming the software are installed from a network such as the Internet or a memory medium such as the removable medium 2511.

It should be appreciated by those skilled in the art that the memory medium is not limited to the removable medium 2511 shown in FIG. 25, which has program stored therein and is distributed separately from the apparatus so as to provide the programs to users. The removable medium 2511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2502 and the memory section 2508 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. A user equipment for performing channel detection on a plurality of carriers in an unlicensed frequency band for uplink transmissions, the user equipment comprising:
    a processing circuit,
    the plurality of carriers comprises a first carrier and a second carrier, and
    the processing circuit is configured to:
        perform channel detection selected from the group consisting of a first type of the channel detection and a second type of the channel detection that is different from the first type of the channel detection;
        perform the first type of the channel detection on the first carrier to confirm whether the first carrier is available;
        wherein a type of the channel detection performed on the first carrier is different from the type of the channel detection performed on the second carrier; and
        in response to a condition that the first type of the channel detection is performed on the first carrier, perform the second type of the channel detection on the second carrier to confirm whether the second carrier is available.

2. The user equipment according to claim 1, wherein at least one of the first type of the channel detection or the second type of the channel detection comprises energy detection.

3. The user equipment according to claim 2, wherein, in said at least one of the first type of the channel detection or the second type of the channel detection, the energy detection is performed using a threshold.

4. The user equipment according to claim 2, wherein, in said at least one of the first type of the channel detection or the second type of the channel detection, the energy detection is performed using a contention window.

5. The user equipment according to claim 4, wherein, in said at least one of the first type of the channel detection or the second type of the channel detection, the contention window has a variable size.

* * * * *